United States Patent
Zhou et al.

(10) Patent No.: US 11,974,240 B2
(45) Date of Patent: Apr. 30, 2024

(54) RESOURCE INFORMATION DETERMINING METHOD AND DEVICE, STORAGE MEDIUM, AND USER EQUIPMENT

(71) Applicant: SPREADTRUM COMMUNICATIONS (SHANGHAI) CO., LTD., Shanghai (CN)

(72) Inventors: Huayu Zhou, Shanghai (CN); Xingya Shen, Shanghai (CN); Zhengang Pan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 500 days.

(21) Appl. No.: 17/279,854

(22) PCT Filed: Aug. 14, 2019

(86) PCT No.: PCT/CN2019/100515
§ 371 (c)(1),
(2) Date: Mar. 25, 2021

(87) PCT Pub. No.: WO2020/063164
PCT Pub. Date: Apr. 2, 2020

(65) Prior Publication Data
US 2021/0400606 A1     Dec. 23, 2021

(30) Foreign Application Priority Data

Sep. 28, 2018 (CN) .......................... 201811141263.9

(51) Int. Cl.
*H04W 56/00* (2009.01)
*H04L 1/1607* (2023.01)
*H04W 72/044* (2023.01)
*H04W 72/23* (2023.01)

(52) U.S. Cl.
CPC ........ *H04W 56/001* (2013.01); *H04L 1/1614* (2013.01); *H04W 72/044* (2013.01); *H04W 72/23* (2023.01)

(58) Field of Classification Search
None
See application file for complete search history.

(56) References Cited

U.S. PATENT DOCUMENTS

2019/0140880 A1* 5/2019 Li .......................... H04J 11/0086
2019/0150183 A1* 5/2019 Aiba ..................... H04W 24/10
370/336

(Continued)

FOREIGN PATENT DOCUMENTS

| CN | 108370546 A | 8/2018 |
|---|---|---|
| WO | 2018106043 A1 | 6/2018 |
| WO | 2018128427 A1 | 7/2018 |

OTHER PUBLICATIONS

U.S. Appl. No. 62/716,916, filed Aug. 9, 2018, "Frequency Resource Allocation for UL in Unlicensed Band", p. 1-96, Kim et al. (corresponds to U.S. Appl. No. 62/716,916, filed Aug. 9, 2018 above).*

(Continued)

*Primary Examiner* — Gregory B Sefcheck
(74) *Attorney, Agent, or Firm* — CANTOR COLBURN LLP

(57) ABSTRACT

A resource information determining method and device, a storage medium, and a user equipment. The method includes: determining a frequency domain position of a PRB with a minimum index of a synchronization signal block; determining a position of an initial active downlink BWP according to the frequency domain position of the PRB with the minimum index of the synchronization signal block; determining a position of a CORESET of a first type of PDCCH, wherein the position of the CORESET comprises (Continued)

S11: determining a frequency domain position of a Physical Resource Block (PRB) with a minimum index of a synchronization signal block S12: according to the frequency domain position of the PRB with the minimum index of the synchronization signal block, determining a position of an Initial Active Downlink Band-width Part (BWP), wherein the position of the Initial Active Downlink BWP comprises a frequency domain position of a PRB with a minimum index of the Initial Active Downlink BWP and a number of PRBs of the Initial Active Downlink BWP S13: determining a position of a CORESET of a first type of PDCCH, wherein the position of the CORESET comprises a frequency domain position of a PRB with a minimum index of the CORESET and a number of PRBs of the CORESET, or a bitmap-based PRB position of the CORESET the frequency domain position of the PRB with the minimum index of the CORESET and the number of the PRBs of the CORESET, or a position of a bitmap-based PRB of the CORESET. By means of the solution of the present invention, the user equipment can obtain resource configuration of the initial active downlink BWP and resource configuration information of the first type of PDCCH in an NR unlicensed spectrum.

10 Claims, 10 Drawing Sheets

(56) References Cited

U.S. PATENT DOCUMENTS

| | | | | |
|---|---|---|---|---|
| 2019/0223163 | A1* | 7/2019 | Ko | H04W 72/23 |
| 2019/0230534 | A1* | 7/2019 | John Wilson | H04W 24/08 |
| 2019/0313383 | A1* | 10/2019 | Xiong | H04W 16/14 |
| 2019/0313437 | A1* | 10/2019 | Jung | H04L 5/0042 |
| 2020/0053776 | A1* | 2/2020 | John Wilson | H04W 16/14 |
| 2020/0296673 | A1 | 9/2020 | Ouchi et al. | |
| 2020/0404690 | A1* | 12/2020 | Lee | H04L 5/001 |
| 2021/0219268 | A1* | 7/2021 | Li | H04W 72/20 |
| 2021/0329634 | A1* | 10/2021 | Kim | H04L 27/26 |
| 2023/0083208 | A1* | 3/2023 | Zhang | H04L 5/0053 |
| 2023/0113223 | A1* | 4/2023 | Yi | H04J 11/0073 370/329 |

OTHER PUBLICATIONS

Huawei et al., "Coexistence of Different UE Types on a Wideband Carrier" 3GPP TSG RAN WG1 Meeting #90bis R1-1717904, Oct. 13, 2017; 6 pages.

International Search Report for International Application No. PCT/CN02019/100515; dated Nov. 4, 2019.

LG Electronics, "RMSI delivery and CORESET configuration" 3GPP TSG RAN WG1 Meeting NR#3 R1-1715842, Sep. 21, 2017; 8 pages.

NTT DOCOMO, Inc., "Remaing issues on bandwidth parts for NR" 3GPP TSG RAN WG1 Meeting 90bis R1-1718223, Oct. 13, 2017; 4 pages.

Spreadtrum Communications, "Discussion on SS_PBCH block in NR-U operation" 3GPP TSG RAN WG1 Meeting #94 R1-1808807, Aug. 24, 2018; 13 pages.

Catt, "Configuration aspects of the NR-PDCCH", 3GPP TSG RAN WG1 Meeting #90, R1-1712392, Aug. 21-25, 2017, 4 pages.

JP Notice of Reasons for Refusal corresponding to JP Application No. 2021-516813; dated Jun. 28, 2022.

Nokia et al., "Initial active BWP definition for RMSI multiplexing pattern 2 and 3", 3GPP TSG-RAN WG1 meeting #93, R1-1807177, May 21-25, 2018, 6 pages.

NTT DOCOMO, Inc., "Maintenance for NR initial access", 3GPP TSG RAN WG1 Meeting #94, R1-1809134, Aug. 20-24, 2018, 10 pages.

Panasonic, "Channel estimation complexity and search space", SGPP TSG RAN WG1 Meeting #93, R1-1806879, May 21-25, 2018, 4 pages.

Technical Specification Group Radio Access Network, "Physical layer procedures for control", 3GPP TS 38.213, V15.2.0, Jun. 2018, 98 pages.

EPO Extended European Search Report for corresponding EP Application No. 19867408.7; dated May 25, 2022.

Korean Notice of Reasons for Refusal for corresponding KR Application No. 10-2021-7012415; dated May 23, 2022.

Spreadtrum Communications, "Remaining issues on PDCCH structure", 3GPP TSG RAN WG1 Meeting AH 1801, R1-1800285, Jan. 22-26, 2018, 5 pages.

* cited by examiner

RESOURCE INFORMATION DETERMINING METHOD AND DEVICE, STORAGE MEDIUM, AND USER EQUIPMENT

CROSS-REFERENCE TO RELATED APPLICATIONS

This is the U.S. national stage of application No. PCT/CN2019/100515, filed on Aug. 14, 2019. Priority under 35 U.S.C. § 119(a) and 35 U.S.C. § 365(b) is claimed from Chinese Application No. 201811141263.9, filed Sep. 28, 2018, the disclosure of which is also incorporated herein by reference.

TECHNICAL FIELD

The present disclosure generally relates to communication technology field, and more particularly, to a resource information determining method and device, a storage medium and a user equipment.

BACKGROUND

In existing Release 15 NR technology, a position of an Initial Active Downlink Band-width Part (BWP) is usually equal to a position of a Control resource set (CORESET) of a first type of Physical Downlink Control Channel (PDCCH), for example: Type0-PDCCH. Therefore, a user equipment (also known as a terminal) can directly obtain the position of the Initial Active Downlink BWP according to the CORESET of the first type of PDCCH indicated by a Management Information Base (MIB) or a Radio Resource Control (RRC) layer, wherein the first type of PDCCH is also known as a remaining minimum system information (RMSI) PDCCH.

However, in an NR unlicensed spectrum of 5 GHz spectrum, a bandwidth of the Initial Active Downlink BWP is close to 20 MHz and may be fixed in a Wi-Fi channel. The CORESET of the first type of PDCCH may have a certain degree of freedom, for example, may have a bandwidth of less than 20 MHz. Therefore, the position of the Initial Active Downlink BWP may not be equal to the position of the CORESET of the first type of PDCCH.

In summary, a resource information determining method is needed, so that the user equipment can determine a resource configuration of the Initial Active Downlink BWP and a resource configuration of the first type of PDCCH in the NR unlicensed spectrum.

SUMMARY

Embodiments of the present disclosure provide a resource information determining method and device, a storage medium and a user equipment, so that a user equipment can determine a resource configuration of an Initial Active Downlink BWP and a resource configuration of a first type of PDCCH in an NR unlicensed spectrum.

In an embodiment of the present disclosure, a resource information determining method is provided, including: determining a frequency domain position of a Physical Resource Block (PRB) with a minimum index of a synchronization signal block; according to the frequency domain position of the PRB with the minimum index of the synchronization signal block, determining a position of an Initial Active Downlink Band-width Part (BWP), wherein the position of the Initial Active Downlink BWP includes a frequency domain position of a PRB with a minimum index of the Initial Active Downlink BWP and a number of PRBs of the Initial Active Downlink BWP; and determining a position of a Control resource set (CORESET) of a first type of Physical Downlink Control Channel (PDCCH), wherein the position of the CORESET includes a frequency domain position of a PRB with a minimum index of the CORESET and a number of PRBs of the CORESET, or a bitmap-based PRB position of the CORESET.

Optionally, determining the position of the Initial Active Downlink BWP includes: acquiring from a base station a first offset between the frequency domain position of the PRB with the minimum index of the synchronization signal block and the frequency domain position of the PRB with the minimum index of the Initial Active Downlink BWP; and according to the first offset and the frequency domain position of the PRB with the minimum index of the synchronization signal block, determining the frequency domain position of the PRB with the minimum index of the Initial Active Downlink BWP.

Optionally, determining the position of the CORESET of the first type of PDCCH includes: according to a second offset between the PRB with the minimum index of the Initial Active Downlink BWP and the PRB with the minimum index of the CORESET of the first type of PDCCH, and the frequency domain position of the PRB with the minimum index of the Initial Active Downlink BWP, determining the frequency domain position of the PRB with the minimum index of the CORESET of the first type of PDCCH; wherein the second offset is predefined or obtained from the base station.

Optionally, determining the position of the CORESET of the first type of PDCCH includes: according to a third offset between the PRB with the minimum index of the synchronization signal block and the PRB with the minimum index of the CORESET of the first type of PDCCH, and the frequency domain position of the PRB with the minimum index of the Initial Active Downlink BWP, determining the frequency domain position of the PRB with the minimum index of the CORESET of the first type of PDCCH; wherein the third offset is obtained from the base station.

Optionally, the number of PRBs of the Initial Active Downlink BWP has a preset first mapping relationship with a frequency band where the Initial Active Downlink BWP is located; and determining the position of the Initial Active Downlink BWP includes: determining the number of PRBs of the Initial Active Downlink BWP according to the frequency domain position of the PRB with the minimum index of the Initial Active Downlink BWP and the preset first mapping relationship.

Optionally, the number of PRBs of the Initial Active Downlink BWP, a frequency band where the Initial Active Downlink BWP is located and a subcarrier interval of the Initial Active Downlink BWP have a preset second mapping relationship; and determining the position of the Initial Active Downlink BWP includes: determining the number of PRBs of the Initial Active Downlink BWP according to the frequency domain position of the PRB with the minimum index of the Initial Active Downlink BWP, the subcarrier interval and the preset second mapping relationship.

Optionally, determining the position of the CORESET of the first type of PDCCH includes: acquiring a bitmap of bitmap resource units of the CORESET of the first type of PDCCH from a base station, where each bitmap resource unit includes at least one PRB, and the bitmap resource units correspond to bits in the bitmap; and according to the bitmap, determining the bitmap-based PRB position of the CORESET of the first type of PDCCH.

Optionally, determining the position of the Initial Active Downlink BWP includes: acquiring the number of PRBs of the Initial Active Downlink BWP from a base station.

Optionally, determining the number of PRBs of the CORESET includes: acquiring the number of PRBs of the CORESET from a base station.

Optionally, a predefined channel where the synchronization signal block is located has a preset third mapping relationship with the frequency domain position of the PRB with the minimum index of the Initial Active Downlink BWP; and determining the position of the Initial Active Downlink BWP includes: according to the frequency domain position of the PRB with the minimum index of the synchronization signal block, determining the predefined channel where the synchronization signal block is located; and according to the predefined channel and the preset third mapping relationship, determining the frequency domain position of the PRB with the minimum index of the Initial Active Downlink BWP.

Optionally, the predefined channel where the synchronization signal block is located has a preset fourth mapping relationship with the number of PRBs of the Initial Active Downlink BWP; and determining the position of the Initial Active Downlink BWP includes: according to the predefined channel and the preset fourth mapping relationship, determining the number of PRBs of the Initial Active Downlink BWP.

Optionally, determining the position of the CORESET of the first type of PDCCH includes: determining the frequency domain position of the PRB with the minimum index of the CORESET of the first type of PDCCH to be same as the frequency domain position of the PRB with the minimum index of the Initial Active Downlink BWP.

Optionally, the number of PRBs of the CORESET of the first type of PDCCH, a duration of the CORESET of the first type of PDCCH and a subcarrier interval of the Initial Active Downlink BWP have a preset fifth mapping relationship; and determining the position of the CORESET of the first type of PDCCH includes: according to the duration of the CORESET of the first type of PDCCH, the subcarrier interval of the Initial Active Downlink BWP and the preset fifth mapping relationship, determining the number of PRBs of the CORESET of the first type of PDCCH; wherein the number of PRBs of the CORESET of the first type of PDCCH is same as the number of PRBs of the Initial Active Downlink BWP; and wherein the duration of the CORESET of the first type of PDCCH is predetermined or acquired from a base station.

Optionally, determining the position of the CORESET of the first type of PDCCH includes: according to a duration of the CORESET of the first type of PDCCH being 2 Orthogonal Frequency Division Multiplexing (OFDM) symbols, determining a start symbol of a monitoring opportunity of the first type of PDCCH is Symbol 0 and/or Symbol 7 in a time slot; and according to the duration of the CORESET of the first type of PDCCH being 1 OFDM symbol, determining the start symbol of the monitoring opportunity of the first type of PDCCH is Symbol 0 and/or Symbol 1 in a time slot.

In an embodiment of the present disclosure, a resource information determining device is provided, including: a synchronization signal block position determining module, adapted to determine a frequency domain position of a Physical Resource Block (PRB) with a minimum index of a synchronization signal block; a BWP position determining module, adapted to, according to the frequency domain position of the PRB with the minimum index of the synchronization signal block, determine a position of an Initial Active Downlink Band-width Part (BWP), wherein the position of the Initial Active Downlink BWP includes a frequency domain position of a PRB with a minimum index of the Initial Active Downlink BWP and a number of PRBs of the Initial Active Downlink BWP; and a CORESET position determining module, adapted to determine a position of a Control resource set (CORESET) of a first type of Physical Downlink Control Channel (PDCCH), wherein the position of the CORESET includes a frequency domain position of a PRB with a minimum index of the CORESET and a number of PRBs of the CORESET, or a bitmap-based PRB position of the CORESET.

Optionally, the BWP position determining module includes: a first offset acquiring sub-module, adapted to acquire from a base station a first offset between the frequency domain position of the PRB with the minimum index of the synchronization signal block and the frequency domain position of the PRB with the minimum index of the Initial Active Downlink BWP; and a first BWP position determining sub-module, adapted to, according to the first offset and the frequency domain position of the PRB with the minimum index of the synchronization signal block, determine the frequency domain position of the PRB with the minimum index of the Initial Active Downlink BWP.

Optionally, the CORESET position determining module includes: a first CORESET position determining module, adapted to, according to a second offset between the PRB with the minimum index of the Initial Active Downlink BWP and the PRB with the minimum index of the CORESET of the first type of PDCCH and the frequency domain position of the PRB with the minimum index of the Initial Active Downlink BWP, determine the frequency domain position of the PRB with the minimum index of the CORESET of the first type of PDCCH; wherein the second offset is predefined or obtained from the base station.

Optionally, the CORESET position determining module includes: a second CORESET position determining module, adapted to, according to a third offset between the PRB with the minimum index of the synchronization signal block and the PRB with the minimum index of the CORESET of the first type of PDCCH and the frequency domain position of the PRB with the minimum index of the Initial Active Downlink BWP, determine the frequency domain position of the PRB with the minimum index of the CORESET of the first type of PDCCH; wherein the third offset is obtained from the base station.

Optionally, the number of PRBs of the Initial Active Downlink BWP has a preset first mapping relationship with a frequency band where the Initial Active Downlink BWP is located; and the BWP position determining module includes: a first BWP number determining sub-module, adapted to determine the number of PRBs of the Initial Active Downlink BWP according to the frequency domain position of the PRB with the minimum index of the Initial Active Downlink BWP and the preset first mapping relationship.

Optionally, the number of PRBs of the Initial Active Downlink BWP, a frequency band where the Initial Active Downlink BWP is located and a subcarrier interval of the Initial Active Downlink BWP have a preset second mapping relationship; and the BWP position determining module includes: a second BWP number determining sub-module, adapted to determine the number of PRBs of the Initial Active Downlink BWP according to the frequency domain position of the PRB with the minimum index of the Initial Active Downlink BWP, the subcarrier interval and the preset second mapping relationship.

Optionally, the CORESET position determining module includes: a bitmap acquiring sub-module, adapted to acquire a bitmap of bitmap resource units of the CORESET of the first type of PDCCH from a base station, where each bitmap resource unit includes at least one PRB, and the bitmap resource units correspond to bits in the bitmap; and a first CORESET position determining sub-module, adapted to determine the bitmap-based PRB position of the CORESET of the first type of PDCCH, according to the bitmap.

Optionally, the BWP position determining module includes: a BWP number acquiring sub-module, adapted to acquire the number of PRBs of the Initial Active Downlink BWP from a base station.

Optionally, the BWP position determining module includes: a CORESET number acquiring sub-module, adapted to acquire the number of PRBs of the CORESET from a base station.

Optionally, a predefined channel where the synchronization signal block is located has a preset third mapping relationship with the frequency domain position of the PRB with the minimum index of the Initial Active Downlink BWP; and the BWP position determining module includes: a channel determining sub-module, adapted to, according to the frequency domain position of the PRB with the minimum index of the synchronization signal block, determine the predefined channel where the synchronization signal block is located;

and a second BWP position determining sub-module, adapted to, according to the predefined channel and the preset third mapping relationship, determine the frequency domain position of the PRB with the minimum index of the Initial Active Downlink BWP.

Optionally, the predefined channel where the synchronization signal block is located has a preset fourth mapping relationship with the number of PRBs of the Initial Active Downlink BWP; and the BWP position determining module includes: a third BWP number determining sub-module, adapted to, according to the predefined channel and the preset fourth mapping relationship, determine the number of PRBs of the Initial Active Downlink BWP.

Optionally, the CORESET position determining module includes: a third CORESET position determining sub-module, adapted to determine the frequency domain position of the PRB with the minimum index of the CORESET of the first type of PDCCH to be same as the frequency domain position of the PRB with the minimum index of the Initial Active Downlink BWP.

Optionally, the number of PRBs of the CORESET of the first type of PDCCH, a duration of the CORESET of the first type of PDCCH and a subcarrier interval of the Initial Active Downlink BWP have a preset fifth mapping relationship; and the CORESET position determining module includes: a second CORESET number determining sub-module, adapted to, according to the duration of the CORESET of the first type of PDCCH, the subcarrier interval of the Initial Active Downlink BWP and the preset fifth mapping relationship, determine the number of PRBs of the CORESET of the first type of PDCCH; wherein the number of PRBs of the CORESET of the first type of PDCCH is same as the number of PRBs of the Initial Active Downlink BWP; and wherein the duration of the CORESET of the first type of PDCCH is predetermined or acquired from a base station.

Optionally, the CORESET position determining module includes: a third PDCCH determining sub-module, adapted to, according to a duration of the CORESET of the first type of PDCCH being 2 Orthogonal Frequency Division Multiplexing (OFDM) symbols, determine a start symbol of a monitoring opportunity of the first type of PDCCH is Symbol 0 and/or Symbol 7 in a time slot; and a fourth PDCCH determining sub-module, adapted to, according to the duration of the CORESET of the first type of PDCCH being 1 OFDM symbol, determining the start symbol of the monitoring opportunity of the first type of PDCCH is Symbol 0 and/or Symbol 1 in a time slot.

In an embodiment of the present disclosure, a storage medium having computer instructions stored therein is provided, wherein once the computer instructions are executed, the above resource information determining method is performed.

In an embodiment of the present disclosure, a user equipment including a memory and a processor is provided, wherein the memory has computer instructions stored therein, and when the processor executes the computer instructions, the above resource information determining method is performed.

Embodiments of the present disclosure may provide following advantages.

In embodiments of the present disclosure, according to the frequency domain position of the PRB with the minimum index of the synchronization signal block, the position of an Initial Active Downlink BWP can be determined, and the position of a CORESET of a first type of PDCCH can also be determined. According to the embodiments, a user equipment can determine a resource configuration of the Initial Active Downlink BWP and a resource configuration of the first type of PDCCH in an NR unlicensed spectrum.

Further, the position of the Initial Active Downlink BWP can be determined in various ways, which facilitates the user equipment to make a selection according to a specific situation, thereby improving the user experience.

Further, the position of the CORESET of the first type of PDCCH can be determined in various ways, which facilitates the user equipment to make a selection according to a specific situation, thereby improving the user experience.

DETAILED DESCRIPTION

In prior art, a position of an Initial Active Downlink BWP is usually equal to a position of a CORESET of a first type of PDCCH. However, in an NR unlicensed spectrum, the position of the Initial Active Downlink BWP may not be equal to the position of the CORESET of the first type of PDCCH, which makes it difficult for a user equipment to determine a resource configuration of the Initial Active Downlink BWP and a resource configuration of the first type of PDCCH.

In embodiments of the present disclosure, a Physical Resource Block (PRB) with a minimum index may also be referred to as a first PRB, that is, a PRB with a minimum index of a synchronization signal block may also be referred to as a first PRB of the synchronization signal block, a PRB with a minimum index of an Initial Active Downlink BWP may also be referred to as a first PRB of the Initial Active Downlink BWP, and a PRB with a minimum index of a CORESET of a first type of PDCCH may also be referred to as a first PRB of the CORESET of the first type of PDCCH.

In embodiments of the present disclosure, a number of PRBs of an Initial Active Downlink BWP may also be referred to as a number of consecutive PRBs of the Initial Active Downlink BWP.

In embodiments of the present disclosure, a PRB with a minimum index of a synchronization signal block may be a PRB with a minimum index on a common resource block (common RB) overlapping with the synchronization signal block.

In embodiments of the present disclosure, a PRB may also be referred to as a Resource Block (RB).

In embodiments of the present disclosure, bitmap resource units may also be referred to as a PRB group. Generally, a bit in a bitmap is 1 indicates that one or multiple PRBs in a bitmap resource unit is the PRBs of a CORESET; and a bit in a bitmap is 0 indicates that one or multiple PRBs in a bitmap resource unit is not the PRB of the CORESET. In the embodiments, a predefined channel may be a predetermined frequency range, and may also be a pre-determined frequency range for an unlicensed spectrum, for example, a 20 MHz channel defined by Wi-Fi technology.

In embodiments of the present disclosure, according to a frequency domain position of a PRB with a minimum index of a synchronization signal block, a position of an Initial Active Downlink BWP is determined, and a position of a CORESET of a first type of PDCCH can also be determined. According to the embodiments, a user equipment can determine a resource configuration of the Initial Active Downlink BWP and a resource configuration of the first type of PDCCH in an NR unlicensed spectrum.

In order to clarify the object, characteristic and advantages of embodiments of the present disclosure, embodiments of present disclosure will be described clearly in detail in conjunction with accompanying drawings.

Figure 1:
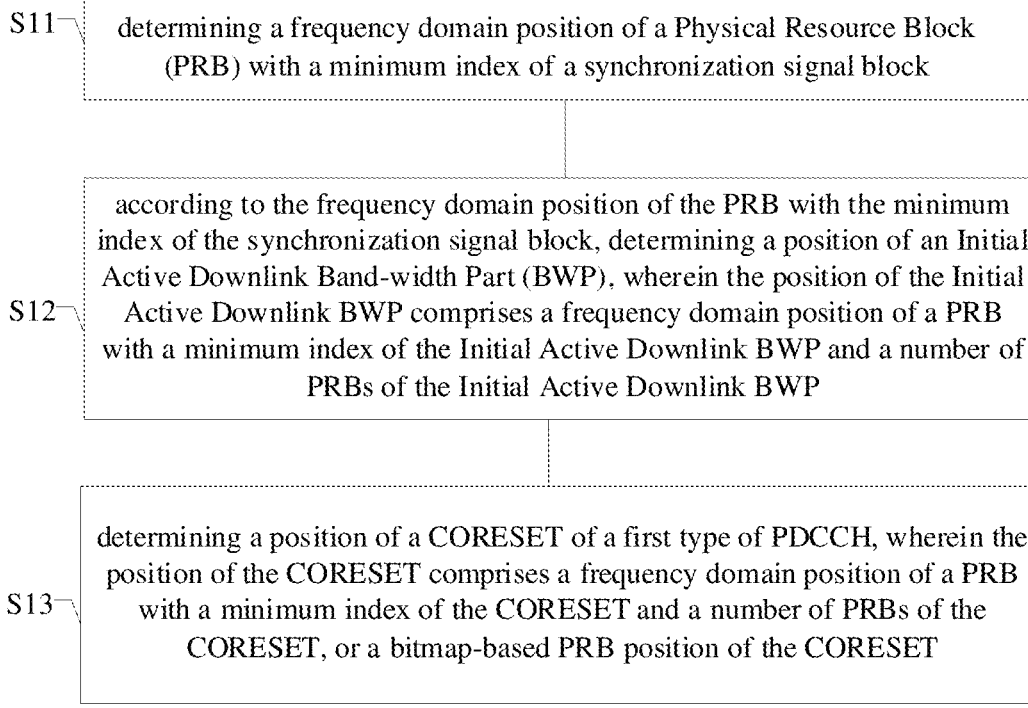
FIG. 1 schematically illustrates a flow chart of a first resource information determining method according to an embodiment.

FIG. 1 schematically illustrates a flow chart of a first resource information determining method according to an embodiment. Referring to FIG. 1, the first resource information determining method includes S11 to S13.

In S11, a frequency domain position of a PRB with a minimum index of a synchronization signal block is determined.

In S12, according to the frequency domain position of the PRB with the minimum index of the synchronization signal block, a position of an Initial Active Downlink BWP is determined, wherein the position of the Initial Active Downlink BWP includes a frequency domain position of a PRB with a minimum index of the Initial Active Downlink BWP and a number of PRBs of the Initial Active Downlink BWP.

In S13, a position of a CORESET of a first type of PDCCH is determined, wherein the position of the CORESET includes a frequency domain position of a PRB with a minimum index of the CORESET and a number of PRBs of the CORESET, or a bitmap-based PRB position of the CORESET.

In some embodiments, the position of the CORESET is determined according to the frequency domain position of the PRB with the minimum index of the CORESET and the number of PRBs of the CORESET, wherein the position of the CORESET is continuous PRBs, and the number of PRBs of the CORESET is continuous.

In some embodiments, the position of the CORESET is determined according to the bitmap-based PRB position of the CORESET, wherein the position of the CORESET may be non-continuous PRBs, which is more flexible.

In some embodiments, in S11, the frequency domain position of the PRB with the minimum index of the synchronization signal block is determined.

In a 5G system, synchronization signals and broadcast channels are transmitted in the form of synchronization signal blocks, and a process of beam sweeping is added. A synchronization signal block (SS/PBCH block) includes a Primary Synchronization Signal (PSS), a Secondary Synchronization Signal (SSS) and a Physical Broadcast Channel (PBCH). Each synchronization signal block may be regarded as a beam resource (in analog domain) in the beam sweeping process. Multiple synchronization signal blocks form a synchronization signal burst (SS-burst). The SS-burst may be regarded as a relatively concentrated resource block including multiple beams. Multiple SS-bursts form a SS-burst-set. The synchronization signal block is repeatedly sent on different beams, which is a beam sweeping process. Through the beam sweeping process, the user equipment can perceive which beam a strongest signal is received from.

Specifically, a time domain position of L synchronization signal blocks in a 5 ms window is fixed. Indexes of the L synchronization signal blocks are arranged continuously in the time domain position: from 0 to (L-1). Therefore, a transmission time of each synchronization signal block in the 5 ms window is fixed, and an index of the synchronization signal block is also fixed.

In some embodiments, in S12, the position of the Initial Active Downlink BWP is determined according to the frequency domain position of the PRB with the minimum index of the synchronization signal block.

Specifically, the position of the Initial Active Downlink BWP may be determined in different ways, for example, a frequency domain position of the Initial Active Downlink BWP may be determined according to an offset provided by the base station, and the number of PRBs of the Initial Active Downlink BWP may be obtained from the base station, which will be described in detail in subsequent embodiments.

In some embodiments, in S13, the bitmap-based PRB position of the CORESET of the first type of PDCCH is determined.

Specifically, the position of the CORESET of the first type of PDCCH may be determined in different ways. For example, the position of the CORESET may be obtained from the base station; or, a frequency domain position of the CORESET of the first type of PDCCH may be determined according to the offset provided by the base station, and a number of PRBs of the CORESET of the first type of PDCCH may be obtained from the base station; or a bitmap-based PRB position of the CORESET of the first type of PDCCH may be determined according to a bitmap, which will be described in detail in subsequent embodiments.

Specifically, the first type of PDCCH may be a RMSI PDCCH. In the NR unlicensed spectrum, a monitoring timing of the RMSI PDCCH is related to a CORESET duration of the RMSI PDCCH, which ensures that the synchronization signal block and time domain resources of the RMSI PDCCH are in a same SS-burst.

In some embodiments, the CORESET may be acquired and the RMSI PDCCH may be determined according to the frequency domain position of the PRB with the minimum index of the CORESET. And a PDSCH scheduled by the RMSI PDCCH on the Initial Active Downlink BWP may be received according to the RMSI PDCCH and the frequency domain position of the PRB with the minimum index of the Initial Active Downlink BWP.

In the embodiments of the present disclosure, according to the frequency domain position of the PRB with the minimum index of the synchronization signal block, the position of the Initial Active Downlink BWP is determined, and the position of the CORESET of the first type of PDCCH can also be determined. According to the embodiments, the user equipment can determine the resource configuration of the Initial Active Downlink BWP and the resource configuration of the first type of PDCCH in the NR unlicensed spectrum.

Figure 2:
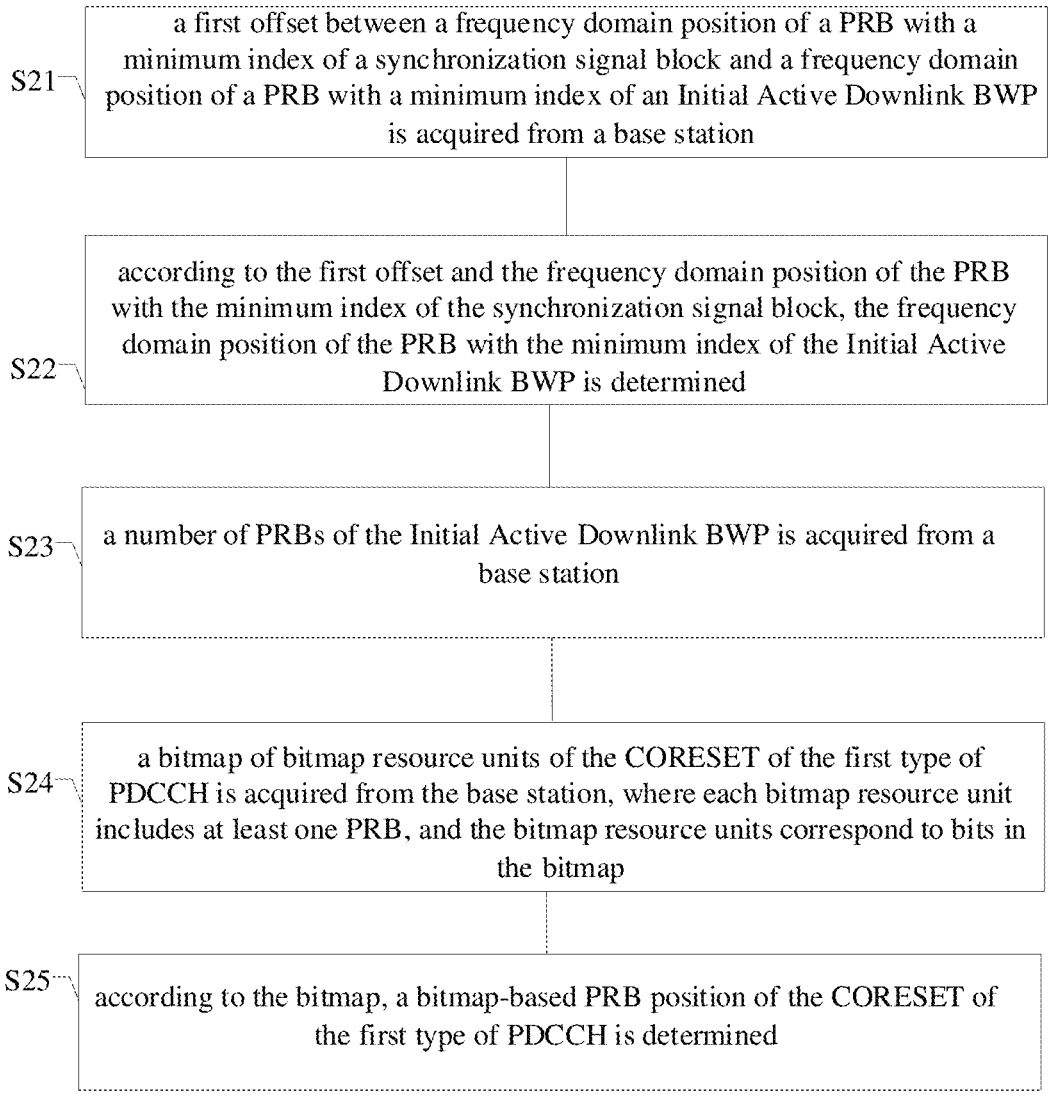
FIG. 2 schematically illustrates a flow chart of a second resource information determining method according to an embodiment FIG. 3 schematically illustrates a flow chart of a third resource information determining method according to an embodiment.

FIG. 2 schematically illustrates a flow chart of a second resource information determining method according to an embodiment. Referring to FIG. 2, the second resource information determining method includes S21 to S25.

In S21, a first offset between a frequency domain position of a PRB with a minimum index of a synchronization signal block and a frequency domain position of a PRB with a minimum index of an Initial Active Downlink BWP is acquired from a base station.

It should be noted that the frequency domain position of the PRB with the minimum index of the synchronization signal block may be obtained through detection. More details may be referred to the descriptions of the method as shown in FIG. 1, and are not described in detail here.

In S22, according to the first offset and the frequency domain position of the PRB with the minimum index of the synchronization signal block, the frequency domain position of the PRB with the minimum index of the Initial Active Downlink BWP is determined.

In S23, a number of PRBs of the Initial Active Downlink BWP is acquired from a base station.

In an embodiment, the number obtained from the base station is the number of PRBs of the Initial Active Downlink BWP.

In another embodiment, the number obtained from the base station is a number of resource units of the Initial Active Downlink BWP, and then a user equipment determines the number of PRBs according to the number of resource units.

In S24, a bitmap of bitmap resource units of the CORESET of the first type of PDCCH is acquired from the base station, where each bitmap resource unit includes at least one PRB, and the bitmap resource units correspond to bits in the bitmap.

In some embodiments, a starting position of the bitmap resource units may be indicated by the base station, or may be the frequency domain position of the PRB with the minimum index of the Initial Active Downlink BWP.

In some embodiments, frequency domain resources of the CORESET of the first type of PDCCH are not continuous, which have a higher degree of freedom.

It should be noted that the bitmap resource units correspond to the bits in the bitmap. If a smallest unit in the bitmap is expressed in a different unit other than bits, each bitmap resource unit corresponds to the different unit in the bitmap.

In an embodiment, each bitmap resource unit includes six PRBs.

In S25, according to the bitmap, a bitmap-based PRB position of the CORESET of the first type of PDCCH is determined.

In some embodiments, the user equipment can determine the position of the CORESET through the bitmap and the bitmap-based PRB position of the CORESET of the first type of PDCCH.

According to the embodiments described above, the first offset is used to determine the frequency domain position of the PRB with the minimum index of the Initial Active Downlink BWP, and the number of PRBs of the Initial Active Downlink BWP is obtained from the base station, thereby determining the position of the Initial Active Downlink BWP; and then the bitmap of the bitmap resource units of the CORESET of the first type of PDCCH is used to determine the position of the CORESET of the first type of PDCCH.

Figure 3:
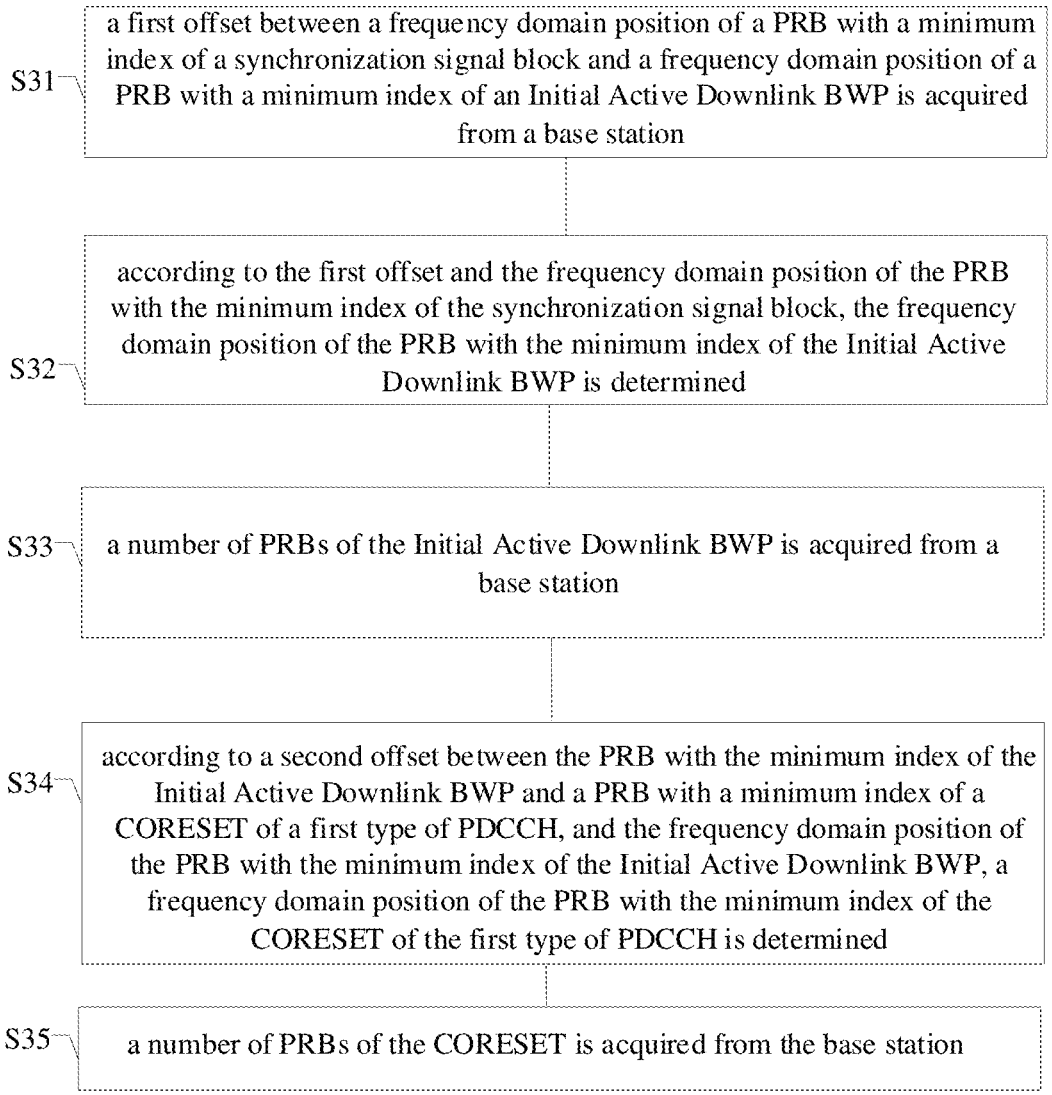

FIG. 3 schematically illustrates a flow chart of a third resource information determining method according to an embodiment. Referring to FIG. 3, the third resource information determining method includes S31 to S35.

In S31, a first offset between a frequency domain position of a PRB with a minimum index of a synchronization signal block and a frequency domain position of a PRB with a minimum index of an Initial Active Downlink BWP is acquired from a base station.

In S32, according to the first offset and the frequency domain position of the PRB with the minimum index of the synchronization signal block, the frequency domain position of the PRB with the minimum index of the Initial Active Downlink BWP is determined.

It should be noted that the frequency domain position of the PRB with the minimum index of the synchronization signal block may be obtained through detection. More details about S31 and S32 may be referred to the descriptions of S21 and S22 as shown in FIG. 2, and are not described in detail here.

In S33, a number of PRBs of the Initial Active Downlink BWP is acquired from a base station.

In an embodiment, the number obtained from the base station is the number of PRBs of the Initial Active Downlink BWP.

In another embodiment, the number obtained from the base station is a number of resource units of the Initial Active Downlink BWP, and then a user equipment determines the number of PRBs according to the number of resource units.

In S34, according to a second offset between the PRB with the minimum index of the Initial Active Downlink BWP and a PRB with a minimum index of a CORESET of a first type of PDCCH, and the frequency domain position of the PRB with the minimum index of the Initial Active Downlink BWP, a frequency domain position of the PRB with the minimum index of the CORESET of the first type of PDCCH is determined.

Specifically, the second offset may be predefined, for example, specified by a communication protocol; or, the second offset may be obtained from the base station. Generally, if the second offset is predefined, the signaling overhead is smaller; if the second offset is obtained from the base station, the signaling overhead is larger, but the flexibility is higher.

When the second offset is predefined, the second offset may be predefined as 0, which facilitates to simplify system implementation.

In S35, a number of PRBs of the CORESET is acquired from the base station.

In an embodiment, the number obtained from the base station may be the number of PRBs of the CORESET of the first type of PDCCH.

In another embodiment, the number obtained from the base station may be a number of resource units of the CORESET of the first type of PDCCH, and then the user equipment may determine the number of PRBs according to the number of resource units, where the resource units of CORESET is different from the bitmap resource units of the CORESET.

According to the embodiments described above, the first offset is used to determine the frequency domain position of the PRB with the minimum index of the Initial Active Downlink BWP, and the number of PRBs of the Initial Active Downlink BWP is obtained from the base station, thereby determining the position of the Initial Active Downlink BWP. And then the second offset is used to determine the frequency domain position of the PRB with the minimum index of the CORESET of the first type of PDCCH, and the number of PRBs of the CORESET is obtained from the base station, thereby determining the position of the CORESET of the first type of PDCCH.

Figure 4:
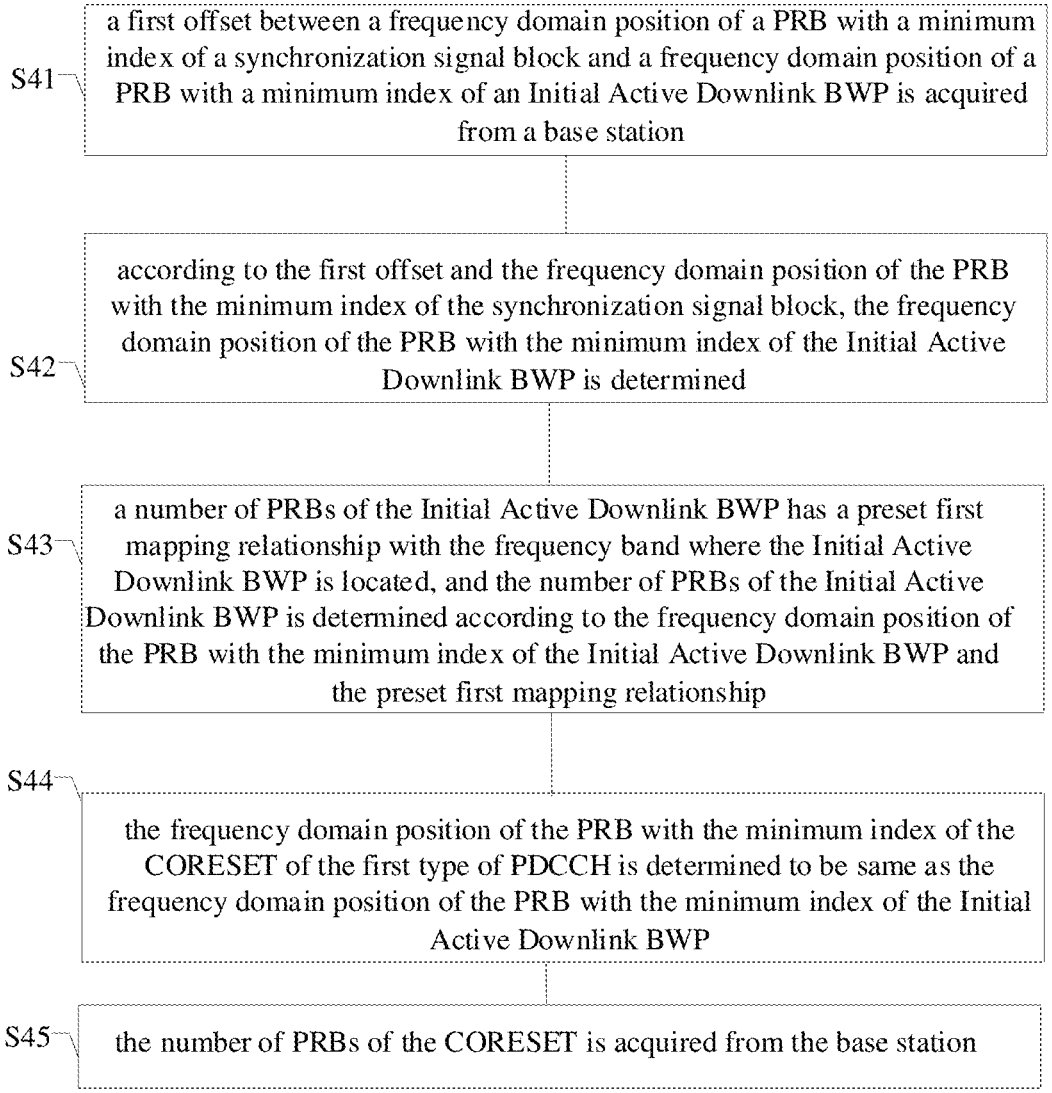
FIG. 4 schematically illustrates a flow chart of a fourth resource information determining method according to an embodiment.

FIG. 4 schematically illustrates a flow chart of a fourth resource information determining method according to an embodiment. Referring to FIG. 4, the fourth resource information determining method includes S41 to S45.

In S41, a first offset between a frequency domain position of a PRB with a minimum index of a synchronization signal block and a frequency domain position of a PRB with a minimum index of an Initial Active Downlink BWP is acquired from a base station.

In S42, according to the first offset and the frequency domain position of the PRB with the minimum index of the synchronization signal block, the frequency domain position of the PRB with the minimum index of the Initial Active Downlink BWP is determined.

It should be noted that the frequency domain position of the PRB with the minimum index of the synchronization signal block may be obtained through detection. More details about S41 and S42 may be referred to the descriptions of S21 and S22 as shown in FIG. 2, and are not described in detail here.

In some embodiments, a mapping relationship between the frequency domain position of the PRB with the minimum index of the Initial Active Downlink BWP and a frequency band where the Initial Active Downlink BWP is located is predefined in the form of a table or a textural description. Specifically, according to the mapping relationship, once the frequency band where the Initial Active Downlink BWP is determined, the frequency domain position of the PRB with the minimum index of the Initial Active Downlink BWP may be determined. In the embodiments of the present disclosure, the mapping relationship between the frequency domain position of the PRB with the minimum index of the Initial Active Downlink BWP and the frequency band where the Initial Active Downlink BWP is located can be determined according to the predefined table or textural description.

In S43, a number of PRBs of the Initial Active Downlink BWP has a preset first mapping relationship with the frequency band where the Initial Active Downlink BWP is located, and the number of PRBs of the Initial Active Downlink BWP is determined according to the frequency domain position of the PRB with the minimum index of the Initial Active Downlink BWP and the preset first mapping relationship.

In some embodiments, a mapping relationship between the number of PRBs of the Initial Active Downlink BWP and the frequency band where the Initial Active Downlink BWP is located is predefined in the form of a table or a textural description. Specifically, according to the mapping relationship, once the frequency band where the Initial Active Downlink BWP is determined, the number of PRBs of the Initial Active Downlink BWP may be determined. In the embodiments of the present disclosure, the preset first mapping relationship between the number of PRBs of the Initial Active Downlink BWP and the frequency band where the Initial Active Downlink BWP is located can be determined according to the predefined table or textural description.

In S44, the frequency domain position of the PRB with the minimum index of the CORESET of the first type of PDCCH is determined to be same as the frequency domain position of the PRB with the minimum index of the Initial Active Downlink BWP.

Specifically, by setting the frequency domain position of the PRB with the minimum index of the CORESET of the first type of PDCCH to be the same as the frequency domain position of the PRB with the minimum index of the Initial Active Downlink BWP, the processing method in the prior art when the two frequency domain positions are the same can be used, thereby reducing signaling overhead and saving resources.

In S45, the number of PRBs of the CORESET is acquired from the base station.

In an embodiment, the number obtained from the base station may be the number of PRBs of the CORESET of the first type of PDCCH.

In another embodiment, the number obtained from the base station may be a number of resource units of the CORESET of the first type of PDCCH, and then the user equipment may determine the number of PRBs according to the number of resource units, where the resource units of CORESET is different from the bitmap resource units of the CORESET.

According to the embodiments described above, the first offset is used to determine the frequency domain position of the PRB with the minimum index of the Initial Active Downlink BWP; furthermore, the number of PRBs of the Initial Active Downlink BWP is determined according to the first mapping relationship, thereby determining the position of the Initial Active Downlink BWP. Thereafter, the frequency domain position of the PRB with the minimum index of the CORESET of the first type of PDCCH is determined to be same as the frequency domain position of the PRB with the minimum index of the Initial Active Downlink BWP; and then by acquiring the number of PRBs of the CORESET, the position of the CORESET of the first type of PDCCH can be determined.

Figure 5:
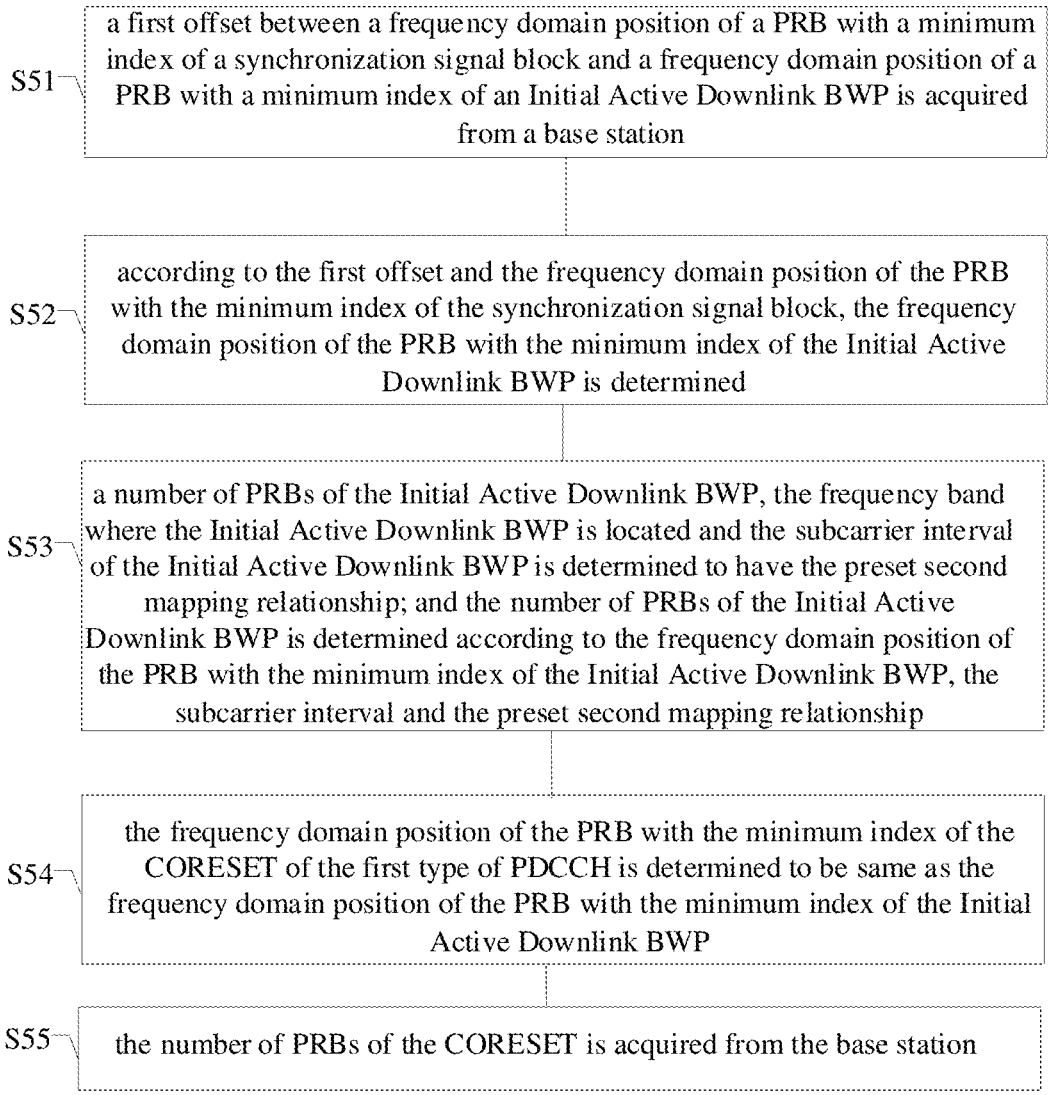
FIG. 5 schematically illustrates a flow chart of a fifth resource information determining method according to an embodiment.

FIG. 5 schematically illustrates a flow chart of a fifth resource information determining method according to an embodiment. Referring to FIG. 5, the fifth resource information determining method includes S51 to S55.

In S51, a first offset between a frequency domain position of a PRB with a minimum index of a synchronization signal block and a frequency domain position of a PRB with a minimum index of an Initial Active Downlink BWP is acquired from a base station.

In S52, according to the first offset and the frequency domain position of the PRB with the minimum index of the synchronization signal block, the frequency domain position of the PRB with the minimum index of the Initial Active Downlink BWP is determined.

It should be noted that the frequency domain position of the PRB with the minimum index of the synchronization signal block may be obtained through detection. More details about S51 and S52 may be referred to the descriptions of S21 and S22 as shown in FIG. 2, and are not described in detail here.

In some embodiments, a mapping relationship between the frequency domain position of the PRB with the minimum index of the Initial Active Downlink BWP, a frequency band where the Initial Active Downlink BWP is located and a subcarrier interval of the Initial Active Downlink BWP is predefined in the form of a table or a textual description. Specifically, according to the mapping relationship, once the frequency band where the Initial Active Downlink BWP and the subcarrier interval of the Initial Active Downlink BWP are determined, the frequency domain position of the PRB with the minimum index of the Initial Active Downlink BWP may be determined. In the embodiments, a preset second mapping relationship between the frequency domain position of the PRB with the minimum index of the Initial Active Downlink BWP, the frequency band where the Initial Active Downlink BWP is located and the subcarrier interval of the Initial Active Downlink BWP can be determined according to the predefined table or textual description.

In S53, a number of PRBs of the Initial Active Downlink BWP, the frequency band where the Initial Active Downlink BWP is located and the subcarrier interval of the Initial Active Downlink BWP is determined to have the preset second mapping relationship; and the number of PRBs of the Initial Active Downlink BWP is determined according to the frequency domain position of the PRB with the minimum index of the Initial Active Downlink BWP, the subcarrier interval and the preset second mapping relationship.

In some embodiments, a mapping relationship between number of PRBs of the Initial Active Downlink BWP, the frequency band where the Initial Active Downlink BWP is located and the subcarrier interval of the Initial Active Downlink BWP is predefined in the form of a table or a textual description. Specifically, according to the mapping relationship, once the frequency band where the Initial Active Downlink BWP and the subcarrier interval of the Initial Active Downlink BWP are determined, the number of PRBs of the Initial Active Downlink BWP may be determined. In the embodiments, the preset second mapping relationship between the number of PRBs of the Initial Active Downlink BWP, the frequency band where the Initial Active Downlink BWP is located and the subcarrier interval of the Initial Active Downlink BWP can be determined according to the predefined table or textual description.

In S54, the frequency domain position of the PRB with the minimum index of the CORESET of the first type of PDCCH is determined to be same as the frequency domain position of the PRB with the minimum index of the Initial Active Downlink BWP.

Specifically, by setting the frequency domain position of the PRB with the minimum index of the CORESET of the first type of PDCCH to be the same as the frequency domain position of the PRB with the minimum index of the Initial Active Downlink BWP, the processing method in the prior art when the two frequency domain positions are the same can be used, thereby reducing signaling overhead and saving resources.

In S55, the number of PRBs of the CORESET is acquired from the base station.

In an embodiment, the number obtained from the base station may be the number of PRBs of the CORESET of the first type of PDCCH.

In another embodiment, the number obtained from the base station may be a number of resource units of the CORESET of the first type of PDCCH, and then the user equipment may determine the number of PRBs according to the number of resource units, where the resource units of CORESET is different from the bitmap resource units of the CORESET.

According to the embodiments described above, the first offset is used to determine the frequency domain position of the PRB with the minimum index of the Initial Active Downlink BWP; furthermore, the number of PRBs of the Initial Active Downlink BWP is determined according to the second mapping relationship, thereby determining the position of the Initial Active Downlink BWP. Thereafter, the frequency domain position of the PRB with the minimum index of the CORESET of the first type of PDCCH is determined to be same as the frequency domain position of the PRB with the minimum index of the Initial Active Downlink BWP; and then by acquiring the number of PRBs of the CORESET, the position of the CORESET of the first type of PDCCH can be determined.

Figure 6:
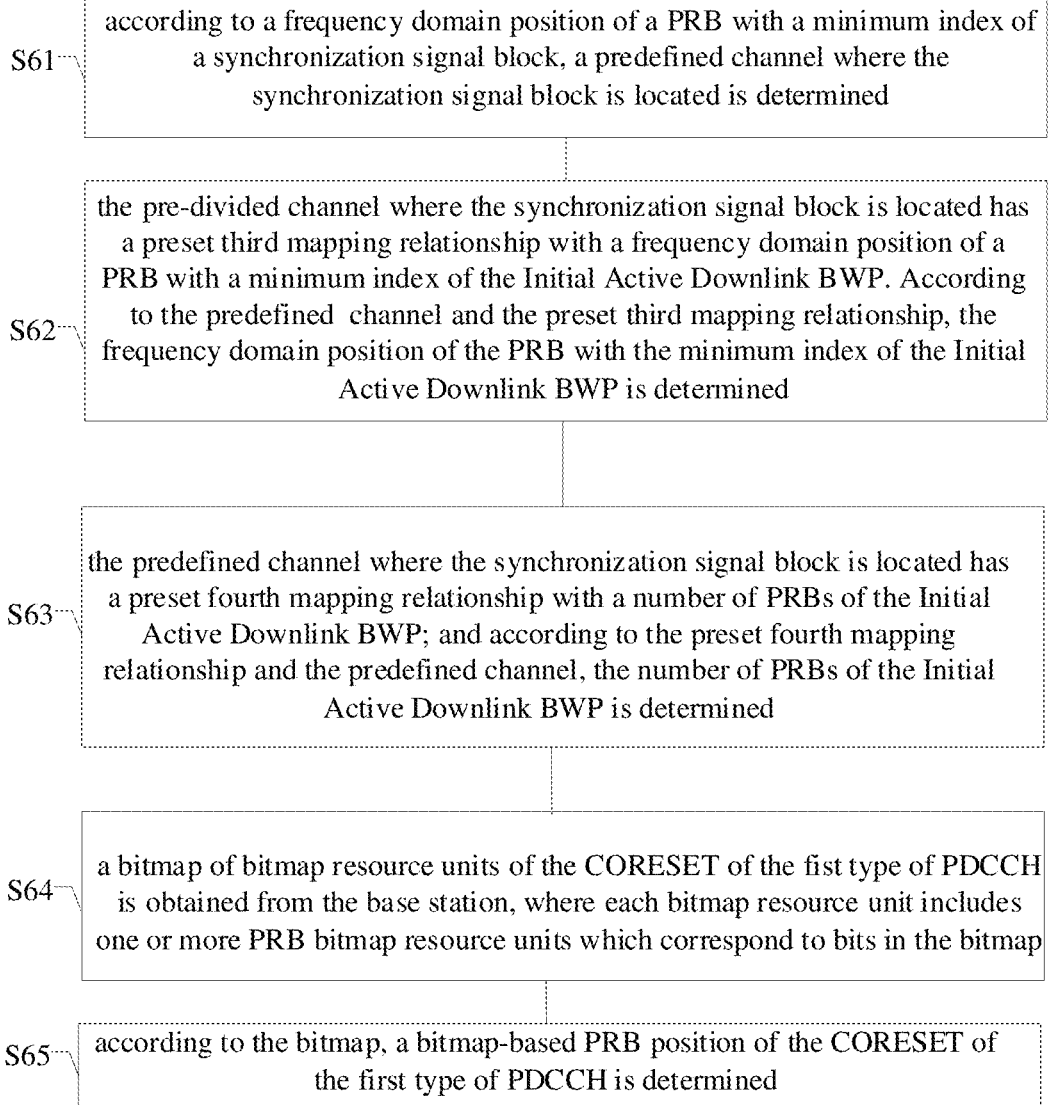
FIG. 6 schematically illustrates a flow chart of a sixth resource information determining method according to an embodiment.

FIG. 6 schematically illustrates a flow chart of a sixth resource information determining method according to an embodiment. Referring to FIG. 6, the sixth resource information determining method includes S61 to S65.

In S61, according to a frequency domain position of a PRB with a minimum index of a synchronization signal block, a predefined channel where the synchronization signal block is located is determined.

In some embodiments, determining the predefined channel where the synchronization signal block is located may be determining which predefined channel includes or overlaps with the synchronization signal block.

In some embodiments, the predefined channel may be a predefined frequency range. Specifically, the predefined channel may be a frequency range predefined in an unlicensed spectrum, for example, a 20 MHz channel defined by Wi-Fi technology.

In some embodiments, as for a frequency domain position of an Initial Active Downlink BWP, a user equipment may derive the predefined channel where the synchronization signal block is located after obtaining the frequency domain position of the synchronization signal block. It should be noted out that the frequency domain position of the PRB with the minimum index of the synchronization signal block may be obtained through detection.

In S62, the predefined channel where the synchronization signal block is located has a preset third mapping relationship with a frequency domain position of a PRB with a minimum index of the Initial Active Downlink BWP. According to the predefined channel and the preset third mapping relationship, the frequency domain position of the PRB with the minimum index of the Initial Active Downlink BWP is determined.

In some embodiments, the predefined channel and positions of all PRBs of the Initial Active Downlink BWP may be pre-determined, or pre-defined in a table, and the user equipment may use a row or column of the table indicated by the base station to Obtain a specific relationship between the predefined channel and the positions of all PRBs of the Initial Active Downlink BWP.

In some embodiments, a mapping relationship between the frequency domain position of the PRB with the minimum index of the Initial Active Downlink BWP and the predefined channel where the synchronization signal block is located is predefined in the form of a table or a textural description. In the embodiments of the present disclosure, the preset third mapping relationship between the frequency domain position of the PRB with the minimum index of the Initial Active Downlink BWP and the predefined channel where the synchronization signal block is located can be determined according to the predefined table or textural description.

In S63, the predefined channel where the synchronization signal block is located has a preset fourth mapping relationship with a number of PRBs of the Initial Active Downlink BWP; and according to the preset fourth mapping relationship and the predefined channel, the number of PRBs of the Initial Active Downlink BWP is determined.

In some embodiments, a mapping relationship between the predefined channel where the synchronization signal block is located and the number of PRBs of the Initial Active Downlink BWP is predefined in the form of a table or a textural description. In the embodiments of the present disclosure, the preset fourth mapping relationship between the predefined channel where the synchronization signal block is located and the number of PRBs of the Initial Active Downlink BWP can be determined according to the predefined table or textural description.

In S64, a bitmap of bitmap resource units of the CORESET of the first type of PDCCH is obtained from the base station, where each bitmap resource unit includes one or more PRB bitmap resource units which correspond to bits in the bitmap.

In some embodiments, a starting position of the bitmap resource units may be indicated by the base station, or may be the frequency domain position of the PRB with the minimum index of the Initial Active Downlink BWP.

In some embodiments, frequency domain resources of the CORESET of the first type of PDCCH are not continuous, which have a higher degree of freedom.

It should be noted that the bitmap resource units correspond to the bits in the bitmap. If a smallest unit in the bitmap is expressed in a different unit other than bits, each bitmap resource unit corresponds to the different unit in the bitmap.

In an embodiment, each bitmap resource unit includes six PRBs.

In S65, according to the bitmap, a bitmap-based PRB position of the CORESET of the first type of PDCCH is determined.

In some embodiments, the user equipment can determine the position of the CORESET through the bitmap and the bitmap-based PRB position of the CORESET of the first type of PDCCH.

According to the embodiments described above, the frequency domain position of the PRB with the minimum index of the Initial Active Downlink BWP is determined according to the preset third mapping relationship; furthermore, the number of PRBs of the Initial Active Downlink BWP is determined according to the preset fourth mapping relationship; and then, the position of the CORESET of the first type of PDCCH is determined according to the bitmap of bitmap resource units of the CORESET of the first type of PDCCH.

Figure 7:
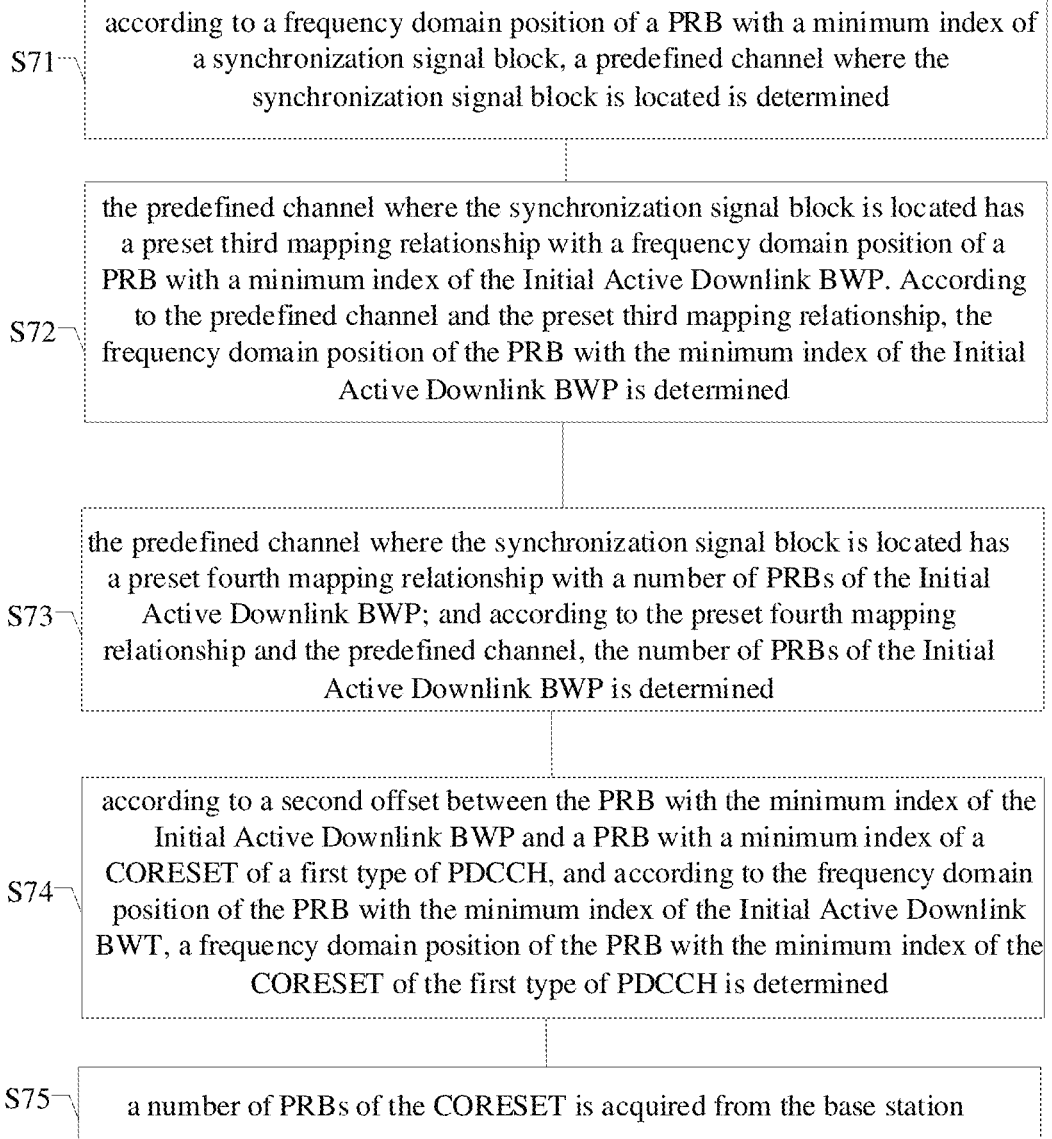
FIG. 7 schematically illustrates a flow chart of a seventh resource information determining method according to an embodiment.

FIG. 7 schematically illustrates a flow chart of a seventh resource information determining method according to an embodiment. Referring to FIG. 7, the seventh resource information determining method includes S71 to S75.

In S71, according to a frequency domain position of a PRB with a minimum index of a synchronization signal block, a predefined channel where the synchronization signal block is located is determined.

In some embodiments, determining the predefined channel where the synchronization signal block is located may be determining which predefined channel includes or overlaps with the synchronization signal block.

In S72, the predefined channel where the synchronization signal block is located has a preset third mapping relationship with a frequency domain position of a PRB with a minimum index of the Initial Active Downlink BWP. According to the predefined channel and the preset third mapping relationship, the frequency domain position of the PRB with the minimum index of the Initial Active Downlink BWP is determined.

In some embodiments, the predefined channel may be a predefined frequency range. Specifically, the predefined channel may be a frequency range predefined in an unlicensed spectrum, for example, a 20 MHz channel defined by Wi-Fi technology.

In S73, the predefined channel where the synchronization signal block is located has a preset fourth mapping relationship with a number of PRBs of the Initial Active Downlink BWP; and according to the preset fourth mapping relationship and the predefined channel, the number of PRBs of the Initial Active Downlink BWP is determined.

It should be noted that the frequency domain position of the PRB with the minimum index of the synchronization signal block may be obtained through detection. More details about S71 to S73 may be referred to the descriptions of S61 to S63 as shown in FIG. 6, and are not described in detail here.

In S74, according to a second offset between the PRB with the minimum index of the Initial Active Downlink BWP and a PRB with a minimum index of a CORESET of a first type of PDCCH, and according to the frequency domain position of the PRB with the minimum index of the Initial Active Downlink BWP, a frequency domain position of the PRB with the minimum index of the CORESET of the first type of PDCCH is determined.

Specifically, the second offset may be predefined, for example, specified by a communication protocol; or the second offset may be obtained from a base station.

In S75, a number of PRBs of the CORESET is acquired from the base station.

In an embodiment, the number obtained from the base station may be the number of PRBs of the CORESET of the first type of PDCCH.

In another embodiment, the number obtained from the base station may be a number of resource units of the CORESET of the first type of PDCCH, and then the user equipment may determine the number of PRBs according to the number of resource units, where the resource units of CORESET is different from the bitmap resource units of the CORESET.

According to the embodiments described above, the frequency domain position of the PRB with the minimum index of the Initial Active Downlink BWP is determined according to the preset third mapping relationship; next, the number of PRBs of the Initial Active Downlink BWP is determined according to the preset fourth mapping relationship; and then, the frequency domain position of the PRB with the minimum index of the CORESET of the first type of PDCCH is determined according to the second offset, and the number of PRBs of the CORESET is acquired from the base station, thereby determining the position of the CORESET of the first type of PDCCH.

Figure 8:
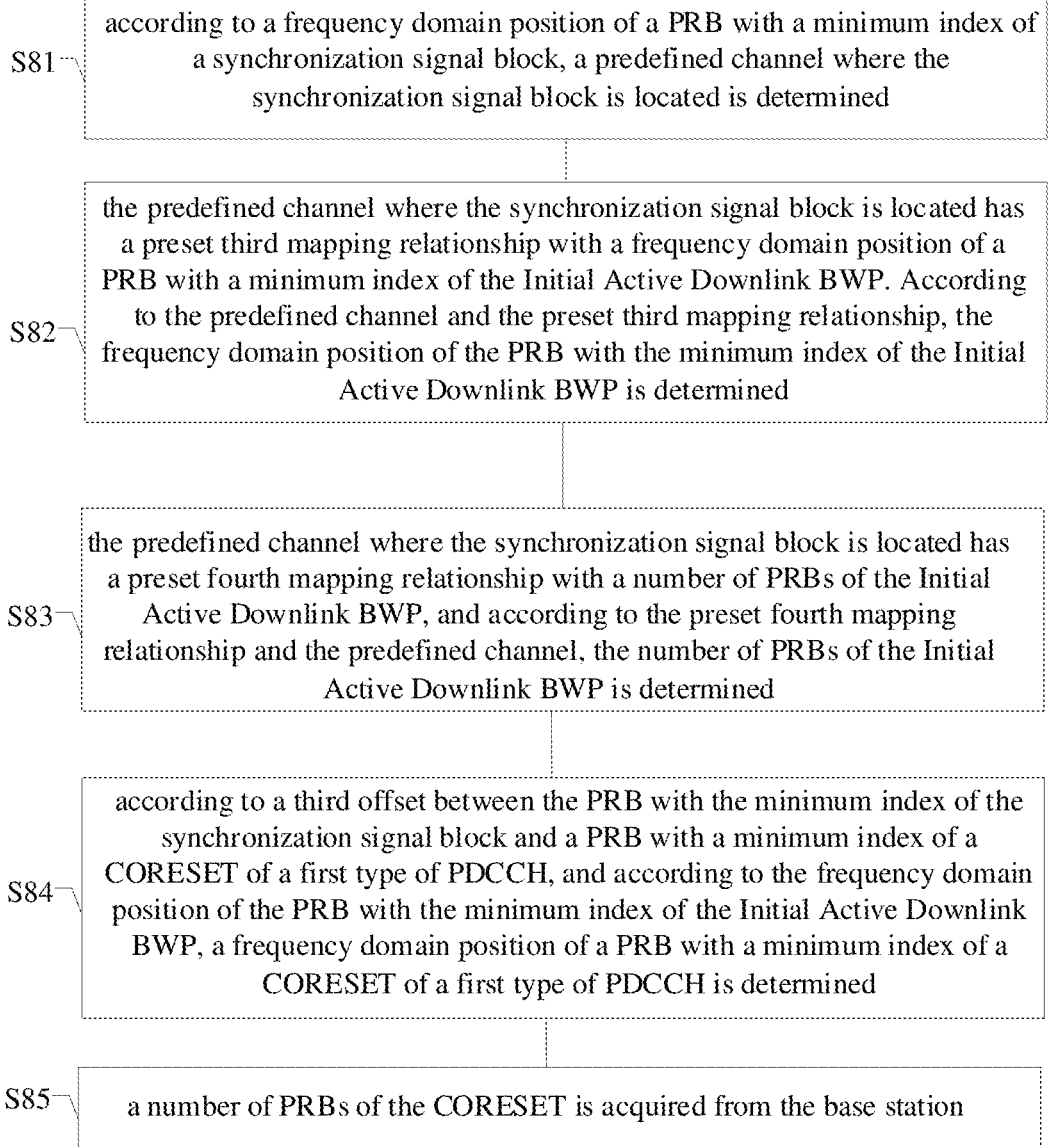
FIG. 8 schematically illustrates a flow chart of an eighth resource information determining method according to an embodiment.

FIG. 8 schematically illustrates a flow chart of an eighth resource information determining method according to an embodiment. Referring to FIG. 8, the eighth resource information determining method includes S81 to S85.

In S81, according to a frequency domain position of a PRB with a minimum index of a synchronization signal block, a predefined channel where the synchronization signal block is located is determined.

In some embodiments, determining the predefined channel where the synchronization signal block is located may be determining which predefined channel includes or overlaps with the synchronization signal block. In some embodiments, the predefined channel may be a predefined frequency range. Specifically, the predefined channel may be a frequency range predefined in an unlicensed spectrum, for example, a 20 MHz channel defined by Wi-Fi technology.

In S82, the predefined channel where the synchronization signal block is located has a preset third mapping relationship with a frequency domain position of a PRB with a minimum index of the Initial Active Downlink BWP. According to the predefined channel and the preset third mapping relationship, the frequency domain position of the PRB with the minimum index of the Initial Active Downlink BWP is determined.

In S83, the predefined channel where the synchronization signal block is located has a preset fourth mapping relationship with a number of PRBs of the Initial Active Downlink BWP, and according to the preset fourth mapping relationship and the predefined channel, the number of PRBs of the Initial Active Downlink BWP is determined.

It should be noted that the frequency domain position of the PRB with the minimum index of the synchronization signal block may be obtained through detection. More details about S81 to S83 may be referred to the descriptions of S61 to S63 as shown in FIG. 6, and are not described in detail here.

In S84, according to a third offset between the PRB with the minimum index of the synchronization signal block and a PRB with a minimum index of a CORESET of a first type of PDCCH, and according to the frequency domain position of the PRB with the minimum index of the Initial Active Downlink BWP, a frequency domain position of a PRB with a minimum index of a CORESET of a first type of PDCCH is determined.

In some embodiments, the third offset is acquired from a base station.

In S85, a number of PRBs of the CORESET is acquired from the base station.

In an embodiment, the number obtained from the base station may be the number of PRBs of the CORESET of the first type of PDCCH.

In another embodiment, the number obtained from the base station may be a number of resource units of the CORESET of the first type of PDCCH, and then the user equipment may determine the number of PRBs according to the number of resource units, where the resource units of CORESET is different from the bitmap resource units of the CORESET.

According to the embodiments described above, the frequency domain position of the PRB with the minimum index of the Initial Active Downlink BWP is determined according to the preset third mapping relationship; next, the number of PRBs of the Initial Active Downlink BWP is determined according to the preset fourth mapping relationship; and then, the frequency domain position of the PRB with the minimum index of the CORESET of the first type of PDCCH is determined according to the third offset, and the number of PRBs of the CORESET is acquired from the base station, thereby determining the position of the CORESET of the first type of PDCCH.

Figure 9:
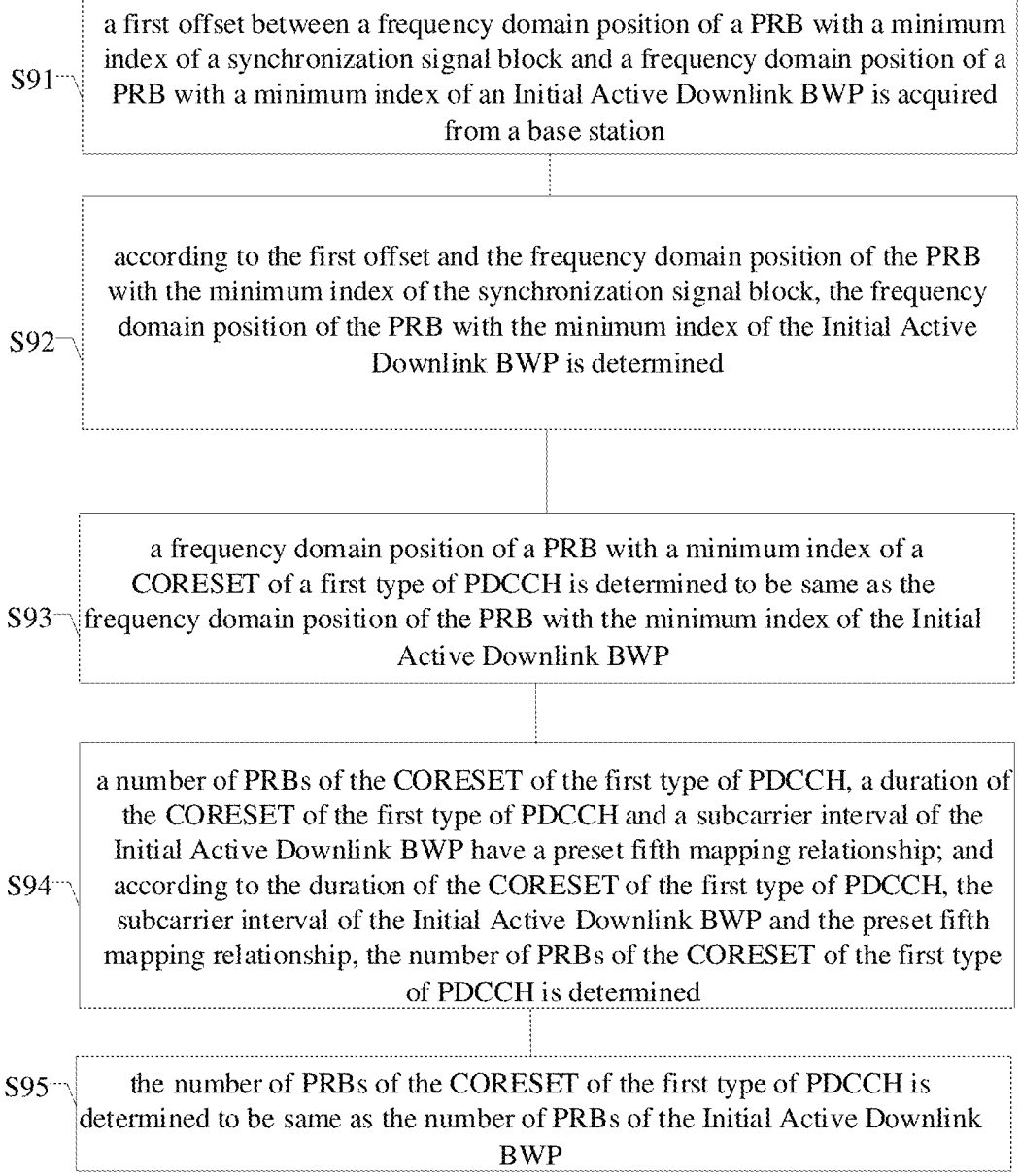
FIG. 9 schematically illustrates a flow chart of a ninth resource information determining method according to an embodiment.

FIG. 9 schematically illustrates a flow chart of a ninth resource information determining method according to an embodiment. Referring to FIG. 9, the ninth resource information determining method includes S91 to S95.

In S91, a first offset between a frequency domain position of a PRB with a minimum index of a synchronization signal block and a frequency domain position of a PRB with a minimum index of an Initial Active Downlink BWP is acquired from a base station.

In S92, according to the first offset and the frequency domain position of the PRB with the minimum index of the synchronization signal block, the frequency domain position of the PRB with the minimum index of the Initial Active Downlink BWP is determined.

It should be noted that the frequency domain position of the PRB with the minimum index of the synchronization signal block may be obtained through detection. More details about S91 and S92 may be referred to the descriptions of S21 and S22 as shown in FIG. 2, and are not described in detail here.

In S93, a frequency domain position of a PRB with a minimum index of a CORESET of a first type of PDCCH is determined to be same as the frequency domain position of the PRB with the minimum index of the Initial Active Downlink BWP.

Specifically, by setting the frequency domain position of the PRB with the minimum index of the CORESET of the first type of PDCCH to be the same as the frequency domain position of the PRB with the minimum index of the Initial Active Downlink BWP, the processing method in the prior art when the two frequency domain positions are the same can be used, thereby reducing signaling overhead and saving resources.

In S94, a number of PRBs of the CORESET of the first type of PDCCH, a duration of the CORESET of the first type of PDCCH and a subcarrier interval of the Initial Active Downlink BWP have a preset fifth mapping relationship; and according to the duration of the CORESET of the first type of PDCCH, the subcarrier interval of the Initial Active Downlink BWP and the preset fifth mapping relationship, the number of PRBs of the CORESET of the first type of PDCCH is determined.

In some embodiments, a mapping relationship between the number of PRBs of the CORESET of the first type of PDCCH, the duration of the CORESET of the first type of PDCCH and the subcarrier interval of the Initial Active Downlink BWP is predefined in the form of a table or a textural description. In the embodiments of the present disclosure, the preset fifth mapping relationship between the number of PRBs of the CORESET of the first type of PDCCH, the duration of the CORESET of the first type of PDCCH and the subcarrier interval of the Initial Active Downlink BWP can be determined according to the pre-defined table or textural description.

In some embodiments, the frequency domain position of the Initial Active Downlink BWP is same as the frequency domain position of the CORESET of the RMSI PDCCH. However, in order to reduce blind detection complexity of a user equipment, frequency domain resources of the CORESET of the RMSI PDCCH need to be limited.

In an embodiment, when the subcarrier interval is 30 kHz, there are about 51 PRBs within 20 MHz bandwidth; so when the duration of the CORESET of the RMSI PDCCH is 1 Orthogonal Frequency Division Multiplexing (OFDM) symbol, the number of PBRs of the CORESET of the RMSI PDCCH is 48; and when the duration of the CORESET of the RMSI PDCCH is 2 OFDM symbols, the number of PBRs of the CORESET of the RMSI PDCCH is 24.

In another embodiment, when the subcarrier interval is 60 kHz, there are about 24 PRBs within 20 MHz bandwidth; so when the duration of the CORESET of the RMSI PDCCH is 1 OFDM symbol, the number of PBRs of the CORESET of the RMSI PDCCH is 24; and when the duration of the CORESET of the RMSI PDCCH is 2 OFDM symbols, the number of PBRs of the CORESET of the RMSI PDCCH is 12 or 24.

Specifically, the duration of the CORESET is pre-defined or acquired from the base station.

In S95, the number of PRBs of the CORESET of the first type of PDCCH is determined to be same as the number of PRBs of the Initial Active Downlink BWP.

Specifically, by setting the frequency domain position of the PRB with the minimum index of the CORESET of the first type of PDCCH to be the same as the frequency domain position of the PRB with the minimum index of the Initial Active Downlink BWP, the processing method in the prior art when the two frequency domain positions are the same can be used, thereby reducing signaling overhead and saving resources.

According to the embodiments described above, the frequency domain position of the PRB with the minimum index of the Initial Active Downlink BWP is determined according to the first offset; next, the number of PRBs of the CORESET is determined according to the preset fifth mapping relationship; and then, the frequency domain position of the PRB with the minimum index of the CORESET of the first type of PDCCH is determined to be same as the frequency domain position of the PRB with the minimum index of the Initial Active Downlink BWP, and the number of PRBs of the CORESET is determined to be same as the number of PRBs of the Initial Active Downlink BWP, thereby determining the position of the Initial Active Downlink BWP and the position of the CORESET of the first type of PDCCH.

Furthermore, determining the position of the CORESET of the first type of PDCCH includes determining the frequency domain position of the CORESET of the first type of PDCCH.

In some embodiments, determining the frequency domain position of the CORESET of the first type of PDCCH includes: according to the duration of the CORESET of the first type of PDCCH being 2 OFDM symbols, determining a start symbol of a monitoring opportunity of the first type of PDCCH is Symbol 0 and/or Symbol 7 in a time slot; and according to the duration of the CORESET of the first type of PDCCH being 1 OFDM symbol, determining the start symbol of the monitoring opportunity of the first type of PDCCH is Symbol 0 and/or Symbol 1 in a time slot.

According to the embodiments described above, by determining the time domain position of the CORESET of the first type of PDCCH, the frequency domain position of the PRB with the minimum index of the CORESET and the number of PRBs of the CORESET, the resource information of the CORESET of the first type of PDCCH can be determined more completely.

According to the embodiments described above, the position of the Initial Active Downlink BWP can be determined in various ways, which facilitates the user equipment to make a selection according to a specific situation, thereby improving the user experience.

According to the embodiments described above, the position of the CORESET of the first type of PDCCH can be determined in various ways, which facilitates the user equipment to make a selection according to a specific situation, thereby improving the user experience.

It should be noted that when the resource information determination methods described in the embodiments of the present disclosure in conjunction with FIGS. 1 to FIG. 9 are implemented, the user equipment may adjust the determination method of one or more parameters according to a specific situation, which should be within the scope of the present disclosure.

Figure 10:
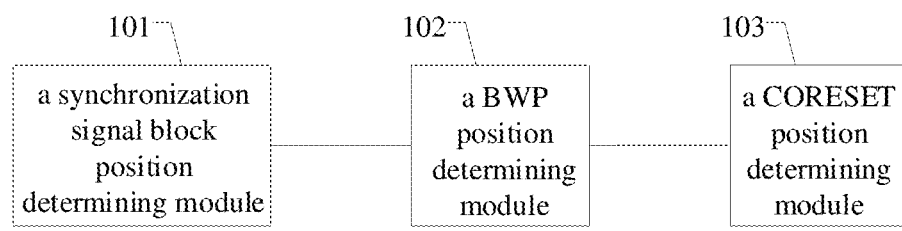
FIG. 10 schematically illustrates a structural diagram of a resource information determining device according to an embodiment.

Referring to FIG. 10, FIG. 10 schematically illustrates a structural diagram of a resource information determining device according to an embodiment. The resource information determining device includes:

a synchronization signal block position determining module 101, adapted to determine a frequency domain position of a PRB with a minimum index of a synchronization signal block;

a BWP position determining module 102, adapted to, according to the frequency domain position of the PRB with the minimum index of the synchronization signal block, determine a position of an Initial Active Downlink Bandwidth Part (BWP), wherein the position of the Initial Active Downlink BWP includes a frequency domain position of a PRB with a minimum index of the Initial Active Downlink BWP and a number of PRBs of the Initial Active Downlink BWP; and a CORESET position determining module 103, adapted to determine a position of a CORESET of a first type of PDCCH, wherein the position of the CORESET includes a frequency domain position of a PRB with a minimum index of the CORESET and a number of PRBs of the CORESET, or a bitmap-based PRB position of the CORESET.

In some embodiments, the BWP position determining module 102 includes: a first offset acquiring sub-module, adapted to acquire from a base station a first offset between the frequency domain position of the PRB with the minimum index of the synchronization signal block and the frequency domain position of the PRB with the minimum index of the Initial Active Downlink BWP; and a first BWP position determining sub-module, adapted to, according to the first offset and the frequency domain position of the PRB with the minimum index of the synchronization signal block, determine the frequency domain position of the PRB with the minimum index of the Initial Active Downlink BWP.

In some embodiments, the CORESET position determining module 103 includes: a first CORESET position determining module, adapted to, according to a second offset between the PRB with the minimum index of the Initial Active Downlink BWP and the PRB with the minimum index of the CORESET of the first type of PDCCH and the frequency domain position of the PRB with the minimum index of the Initial Active Downlink BWP, determine the frequency domain position of the PRB with the minimum index of the CORESET of the first type of PDCCH; wherein the second offset is predefined or obtained from the base station.

In some embodiments, the CORESET position determining module 103 includes: a second CORESET position determining module, adapted to, according to a third offset between the PRB with the minimum index of the synchronization signal block and the PRB with the minimum index of the CORESET of the first type of PDCCH and the frequency domain position of the PRB with the minimum index of the Initial Active Downlink BWP, determine the frequency domain position of the PRB with the minimum index of the CORESET of the first type of PDCCH; wherein the third offset is obtained from the base station.

In some embodiments, the number of PRBs of the Initial Active Downlink BWP has a preset first mapping relationship with a frequency band where the Initial Active Downlink BWP is located; and the BWP position determining module 102 includes: a first BWP number determining sub-module, adapted to determine the number of PRBs of the Initial Active Downlink BWP according to the frequency domain position of the PRB with the minimum index of the Initial Active Downlink BWP and the preset first mapping relationship.

In some embodiments, the number of PRBs of the Initial Active Downlink BWP, a frequency band where the Initial Active Downlink BWP is located and a subcarrier interval of the Initial Active Downlink BWP have a preset second mapping relationship; and the BWP position determining module 102 includes: a second BWP number determining sub-module, adapted to determine the number of PRBs of the Initial Active Downlink BWP according to the frequency domain position of the PRB with the minimum index of the Initial Active Downlink BWP, the subcarrier interval and the preset second mapping relationship.

In some embodiments, the CORESET position determining module 103 includes: a bitmap acquiring sub-module, adapted to acquire a bitmap of bitmap resource units of the CORESET of the first type of PDCCH from a base station, where each bitmap resource unit includes at least one PRB, and the bitmap resource units correspond to bits in the bitmap; and a first CORESET position determining sub-module, adapted to determine the bitmap-based PRB position of the CORESET of the first type of PDCCH, according to the bitmap.

In some embodiments, the BWP position determining module 102 includes: a BWP number acquiring sub-module, adapted to acquire the number of PRBs of the Initial Active Downlink BWP from a base station.

In some embodiments, the BWP position determining module 102 includes: a CORESET number acquiring sub-module, adapted to acquire the number of PRBs of the CORESET from a base station.

In some embodiments, a predefined channel where the synchronization signal block is located has a preset third mapping relationship with the frequency domain position of the PRB with the minimum index of the Initial Active Downlink BWP; and the BWP position determining module 102 includes: a channel determining sub-module, adapted to, according to the frequency domain position of the PRB with the minimum index of the synchronization signal block, determine the predefined channel where the synchronization signal block is located; and a second BWP position determining sub-module, adapted to, according to the predefined channel and the preset third mapping relationship, determine the frequency domain position of the PRB with the minimum index of the Initial Active Downlink BWP.

In some embodiments, the predefined channel where the synchronization signal block is located has a preset fourth mapping relationship with the number of PRBs of the Initial Active Downlink BWP; and the BWP position determining module 102 includes: a third BWP number determining sub-module, adapted to, according to the predefined channel and the preset fourth mapping relationship, determine the number of PRBs of the Initial Active Downlink BWP.

In some embodiments, the CORESET position determining module 103 includes: a third CORESET position determining sub-module, adapted to determine the frequency domain position of the PRB with the minimum index of the CORESET of the first type of PDCCH to be same as the frequency domain position of the PRB with the minimum index of the Initial Active Downlink BWP.

In some embodiments, the number of PRBs of the CORESET of the first type of PDCCH, a duration of the CORESET of the first type of PDCCH and a subcarrier interval of the Initial Active Downlink BWP have a preset fifth mapping relationship; and the CORESET position determining module 103 includes: a second CORESET number determining sub-module, adapted to, according to the duration of the CORESET of the first type of PDCCH, the subcarrier interval of the Initial Active Downlink BWP and the preset fifth mapping relationship, determine the number of PRBs of the CORESET of the first type of PDCCH; wherein the number of PRBs of the CORESET of the first type of PDCCH is same as the number of PRBs of the Initial Active Downlink BWP; and wherein the duration of the CORESET of the first type of PDCCH is predetermined or acquired from a base station.

In some embodiments, the CORESET position determining module 103 includes: a third PDCCH determining sub-module, adapted to, according to a duration of the CORESET of the first type of PDCCH being 2 Orthogonal Frequency Division Multiplexing (OFDM) symbols, determine a start symbol of a monitoring opportunity of the first type of PDCCH is Symbol 0 and/or Symbol 7 in a time slot; and a fourth PDCCH determining sub-module, adapted to, according to the duration of the CORESET of the first type of PDCCH being 1 OFDM symbol, determining the start symbol of the monitoring opportunity of the first type of PDCCH is Symbol 0 and/or Symbol 1 in a time slot.

In an embodiment of the present disclosure, a storage medium having computer instructions stored therein is provided, wherein once the computer instructions are executed, the above resource information determining method as shown in FIGS. 1 to FIG. 9 is performed. The storage medium may be a computer readable storage medium, for example, including a non-volatile or non-transitory memory, an optical disk, a mechanical disk, a solid disk or the like.

In an embodiment of the present disclosure, a user equipment including a memory and a processor is provided, wherein the memory has computer instructions stored therein, and when the processor executes the computer instructions, the above resource information determining method as shown in FIGS. 1 to FIG. 9 is performed. The user equipment may include but not limited to a mobile phone, a computer or a tablet computer.

It is understandable that in LTE Release 12, a Discovery Reference Signal (DRS) is defined for a user equipment to synchronize (that is, track in time-frequency) and measure a Secondary Cell (SCell), which may be called as a "SCell Discovery" process. The advantage of using the DRS is that the DRS is a long-period signal which has less interference to the entire network. The DRS includes a PSS/SSS/CRS, where CRS is a Cell-specific Reference Signal. For a FDD system, a DRS duration is 1 to 5 consecutive subframes; for a TDD system, a DRS duration is 2 to 5 consecutive subframes. A transmission timing of the DRS is defined by a Discovery Measurement Timing Configuration (DMTC). The user equipment assumes that the DRS appears once in each DMTC period.

In a Licensed Assisted Access (LAA) of LTE, the DRS can be used as the "SCell Discovery" process on an unlicensed spectrum, where the long-period characteristic of the DRS can facilitate to reduce the interference to a LAA system and other systems sharing the unlicensed spectrum (for example, a Wi-Fi system). A duration of a LAA DRS is 12 OFDM symbols in a non-empty subframe, thereby further reducing the interference to the LAA system and other systems. The LAA DRS also includes a PSS/SSS/CRS.

The LAA DRS may appear in the following two situations.

For one thing, the user equipment may assume that the LAA DRS may appear in any subframe in the DMTC and may appear in a first subframe that includes a PSS, an SSS and a CRS in the DMTC. In other words, the user equipment assumes that a base station performs Listen Before Talk (LBT) in the DMTC, and if the channel is detected to be idle, the base station sends a DRS in a non-empty subframe.

For another, when the LAA DRS is transmitted together with a PDSCH/PDCCH/EPDCCH, the LAA DRS may only appear in Subframe 0 or Subframe 5. In other words, if the DMTC includes Subframe 0 or Subframe 5, and the user equipment needs to detect the PDCCH/EPDCCH or receive the PDSCH on Subframe 0 or Subframe 5, then the user equipment assumes that the DRS only appears on Subframe 0 or Subframe 5.

Further, a remaining minimum system information in 5G is similar to a SIB1 in the LTE, which includes main system information except MIB. A RMSI is carried in a PDSCH, and the PDSCH is scheduled through a PDCCH. The PDSCH that carries the RMSI is generally called a RMSI PDSCH, and the PDCCH that schedules the RMSI PDSCH is generally called a RMSI PDCCH.

Generally, a search space set includes properties such as a PDCCH monitoring timing and a search space type. The search space set generally binds a CORESET which includes frequency domain resources and durations of the PDCCH.

A search space set where the RMSI PDCCH is located is generally called first type of PDCCH search space set. Generally, the first type of PDCCH search space set configured by MIB or configured by RRC in handover and other situations is called search space 0 (or search space set 0), and the bound CORESET is called CORESET 0. In addition to the search space set of RMSI PDCCH, other public search spaces or public search space sets, for example, a search space set of OSI PDCCH (Type0A-PDCCH search space set), a search space set of RAR PDCCH (Type1-PDCCH search space set), a search space set of a paging PDCCH (Type2-PDCCH search space set), may be considered the same as search space set 0 by default. Generally, the above public search spaces or public search space sets can be reconfigured.

Further, on the NR unlicensed spectrum, it is necessary to define a synchronization signal block so that the user equipment can detect a NR unlicensed spectrum cell in a cell search process. The synchronization signal block may be included in the DRS, where includes DRS synchronization signal blocks as a whole; or the DRS is not defined, and the synchronization signal block exists independently.

On the NR unlicensed spectrum, the base station needs to perform LBT before sending the DRS or the synchronization signal block. Only when the channel is detected to be idle, the base station sends the DRS or the synchronization signal block; otherwise, after a certain period, the base station performs LBT again. The DRS or the synchronization signal block is sent within a certain sending window, which may be agreed upon by the base station and the user equipment, or may be configured by a RRC signaling through DMTC or Synchronization Measurement Timing Configuration (SMTC).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A resource information determining method, comprising:
    determining a frequency domain position of a Physical Resource Block (PRB) with a minimum index of a synchronization signal block;
    determining a position of an Initial Active Downlink Band-width Part (BWP), wherein the position of the Initial Active Downlink BWP comprises a frequency domain position of a PRB with a minimum index of the Initial Active Downlink BWP and a number of PRBs of the Initial Active Downlink BWP; and
    determining a position of a Control resource set (CORESET) of a first type of Physical Downlink Control Channel (PDCCH), wherein the position of the CORESET comprises a frequency domain position of a PRB with a minimum index of the CORESET and a number of PRBs of the CORESET;
    wherein said determining the position of the Initial Active Downlink BWP comprises:
    acquiring from a base station a first offset between the frequency domain position of the PRB with the minimum index of the synchronization signal block and the frequency domain position of the PRB with the minimum index of the Initial Active Downlink BWP; and
    according to the first offset and the frequency domain position of the PRB with the minimum index of the synchronization signal block, determining the frequency domain position of the PRB with the minimum index of the Initial Active Downlink BWP;
    wherein determining the position of the CORESET of the first type of PDCCH comprises:
    according to a second offset between the PRB with the minimum index of the Initial Active Downlink BWP and the PRB with the minimum index of the CORESET of the first type of PDCCH, and the frequency domain position of the PRB with the minimum index of the Initial Active Downlink BWP, determining the frequency domain position of the PRB with the minimum index of the CORESET of the first type of PDCCH;
    wherein the second offset is predefined or obtained from the base station.

2. The resource information determining method according to claim 1, wherein the number of PRBs of the Initial Active Downlink BWP has a preset first mapping relationship with a frequency band where the Initial Active Downlink BWP is located; and determining the position of the Initial Active Downlink BWP comprises:
    determining the number of PRBs of the Initial Active Downlink BWP according to the frequency domain position of the PRB with the minimum index of the Initial Active Downlink BWP and the preset first mapping relationship.

3. The resource information determining method according to claim 1, wherein the number of PRBs of the Initial Active Downlink BWP, a frequency band where the Initial Active Downlink BWP is located and a subcarrier interval spacing of the Initial Active Downlink BWP have a preset second mapping relationship; and determining the position of the Initial Active Downlink BWP comprises:
  determining the number of PRBs of the Initial Active Downlink BWP according to the frequency domain position of the PRB with the minimum index of the Initial Active Downlink BWP, the subcarrier spacing and the preset second mapping relationship.

4. The resource information determining method according to claim 1, wherein determining the position of the Initial Active Downlink BWP comprises:
  acquiring the number of PRBs of the Initial Active Downlink BWP from a base station.

5. The resource information determining method according to claim 1, wherein determining the number of PRBs of the CORESET comprises:
  acquiring the number of PRBs of the CORESET from a base station.

6. The resource information determining method according to claim 1, wherein determining the position of the CORESET of the first type of PDCCH comprises:
  determining the frequency domain position of the PRB with the minimum index of the CORESET of the first type of PDCCH to be same as the frequency domain position of the PRB with the minimum index of the Initial Active Downlink BWP.

7. The resource information determining method according to claim 1, wherein the number of PRBs of the CORESET of the first type of PDCCH, a duration of the CORESET of the first type of PDCCH and a subcarrier spacing of the Initial Active Downlink BWP have a preset fifth mapping relationship; and determining the position of the CORESET of the first type of PDCCH comprises:
  according to the duration of the CORESET of the first type of PDCCH, the subcarrier spacing of the Initial Active Downlink BWP and the preset fifth mapping relationship, determining the number of PRBs of the CORESET of the first type of PDCCH;
  wherein the number of PRBs of the CORESET of the first type of PDCCH is same as the number of PRBs of the Initial Active Downlink BWP; and
  wherein the duration of the CORESET of the first type of PDCCH is predetermined or acquired from a base station.

8. The resource information determining method according to claim 1, wherein determining the position of the CORESET of the first type of PDCCH comprises:
  according to a duration of the CORESET of the first type of PDCCH being 2 Orthogonal Frequency Division Multiplexing (OFDM) symbols, determining a start symbol of a monitoring opportunity of the first type of PDCCH is Symbol 0 and/or Symbol 7 in a time slot; and
  according to the duration of the CORESET of the first type of PDCCH being 1 OFDM symbol, determining the start symbol of the monitoring opportunity of the first type of PDCCH is Symbol 0 and/or Symbol 1 in a time slot.

9. A non-transitory storage medium storing one or more programs, the one or more programs comprising computer instructions, which, when executed by a processor, cause the processor to:
  determine a frequency domain position of a Physical Resource Block (PRB) with a minimum index of a synchronization signal block;
  determine a position of an Initial Active Downlink Bandwidth Part (BWP), wherein the position of the Initial Active Downlink BWP comprises a frequency domain position of a PRB with a minimum index of the Initial Active Downlink BWP and a number of PRBs of the Initial Active Downlink BWP; and
  determine a position of a Control resource set (CORESET) of a first type of Physical Downlink Control Channel (PDCCH), wherein the position of the CORESET comprises a frequency domain position of a PRB with a minimum index of the CORESET and a number of PRBs of the CORESET;
  wherein said determining the position of the Initial Active Downlink BWP comprises:
  acquiring from a base station a first offset between the frequency domain position of the PRB with the minimum index of the synchronization signal block and the frequency domain position of the PRB with the minimum index of the Initial Active Downlink BWP; and
  according to the first offset and the frequency domain position of the PRB with the minimum index of the synchronization signal block, determining the frequency domain position of the PRB with the minimum index of the Initial Active Downlink BWP;
  wherein said determining the position of the CORESET of the first type of PDCCH comprises:
  according to a second offset between the PRB with the minimum index of the Initial Active Downlink BWP and the PRB with the minimum index of the CORESET of the first type of PDCCH, and the frequency domain position of the PRB with the minimum index of the Initial Active Downlink BWP, determining the frequency domain position of the PRB with the minimum index of the CORESET of the first type of PDCCH;
  wherein the second offset is predefined or obtained from the base station.

10. A user equipment having a memory and a processor is provided, wherein the memory stores one or more programs, the one or more programs comprising computer instructions, which, when executed by the processor, cause the processor to:
  determine a frequency domain position of a Physical Resource Block (PRB) with a minimum index of a synchronization signal block;
  determine a position of an Initial Active Downlink Bandwidth Part (BWP), wherein the position of the Initial Active Downlink BWP comprises a frequency domain position of a PRB with a minimum index of the Initial Active Downlink BWP and a number of PRBs of the Initial Active Downlink BWP; and
  determine a position of a Control resource set (CORESET) of a first type of Physical Downlink Control Channel (PDCCH), wherein the position of the CORESET comprises a frequency domain position of a PRB with a minimum index of the CORESET and a number of PRBs of the CORESET;
  wherein said determining the position of the Initial Active Downlink BWP comprises:
  acquiring from a base station a first offset between the frequency domain position of the PRB with the minimum index of the synchronization signal block and the frequency domain position of the PRB with the minimum index of the Initial Active Downlink BWP; and according to the first offset and the frequency domain position of the PRB with the minimum index of the synchronization signal block, determining the frequency domain position of the PRB with the minimum index of the Initial Active Downlink BWP;

wherein said determining the position of the CORESET of the first type of PDCCH comprises:

according to a second offset between the PRB with the minimum index of the Initial Active Downlink BWP and the PRB with the minimum index of the CORESET of the first type of PDCCH, and the frequency domain position of the PRB with the minimum index of the Initial Active Downlink BWP, determining the frequency domain position of the PRB with the minimum index of the CORESET of the first type of PDCCH;

wherein the second offset is predefined or obtained from the base station.

* * * * *